US012576297B2

(12) United States Patent
Mahendra et al.

(10) Patent No.: US 12,576,297 B2
(45) Date of Patent: Mar. 17, 2026

(54) APPARATUS AND METHODS FOR SONOCHEMICAL DEGRADATION OF PER- AND POLYFLUOROALKYL SUBSTANCES

(71) Applicants: THE REGENTS OF THE UNIVERSITY OF CALIFORNIA, Oakland, CA (US); PCT Systems, Inc., San Jose, CA (US)

(72) Inventors: Shaily Mahendra, Santa Monica, CA (US); Shashank Singh Kalra, Los Angeles, CA (US); Sharyl Maraviov, San Jose, CA (US)

(73) Assignees: The Regents of the University of California, Oakland, CA (US); PCT Systems, Inc., San Jose, CA (US)

( * ) Notice: Subject to any disclaimer, the term of this patent is extended or adjusted under 35 U.S.C. 154(b) by 884 days.

(21) Appl. No.: 17/196,981

(22) Filed: Mar. 9, 2021

(65) Prior Publication Data

US 2021/0299504 A1 Sep. 30, 2021

Related U.S. Application Data

(60) Provisional application No. 62/986,981, filed on Mar. 9, 2020.

(51) Int. Cl.
*A62D 3/13* (2007.01)
*A62D 101/22* (2007.01)
(Continued)

(52) U.S. Cl.
CPC ................. *A62D 3/13* (2013.01); *C02F 1/36* (2013.01); *A62D 2101/22* (2013.01); *B01J 19/10* (2013.01); *C02F 2101/36* (2013.01)

(58) Field of Classification Search
CPC .... F17D 3/00; B08B 3/12; A62D 3/13; G05B 21/00; C02F 1/36
See application file for complete search history.

(56) References Cited

U.S. PATENT DOCUMENTS 4,076,617 A * 2/1978 Bybel ....................... C02F 1/36
261/81
5,059,309 A * 10/1991 Jordan ..................... B03D 1/14
261/81
(Continued)

FOREIGN PATENT DOCUMENTS

CN 102372382 A * 3/2012 ................ C02F 1/36
WO WO-2005115925 A1 * 12/2005 ................ C02F 1/36
(Continued)

OTHER PUBLICATIONS

CN 108706682 A; A Low-noise Multi-frequency Ultrasonic Chemical Reactor And Its Application; DU, Dong-dong, Oct. 26, 2018 (Year : 2018).*
(Continued)

*Primary Examiner* — Jonathan M Peo
(74) *Attorney, Agent, or Firm* — Norton Rose Fulbright US LLP

(57) ABSTRACT

The present disclosure includes systems, devices, and methods for a reactor, such as a sonication reactor, for destruction of Per- and polyfluoroalkyl substances (PFASs). In one aspect of the disclosure, the reactor includes a housing having a base and one or more walls that cooperate to define a chamber and a transducer disposed the chamber. The transducer is configured to generate a plurality of sound waves such that when PFAS solution is disposed within the chamber, the sound waves propagate through the liquid and at least some of the one or more PFAS compounds are (Continued)

pyrolyzed or otherwise degraded. Other aspects and features are also claimed and described.

18 Claims, 39 Drawing Sheets

(51) Int. Cl.
| | | |
|---|---|---|
| *B01J 19/10* | (2006.01) | |
| *C02F 1/36* | (2023.01) | |
| *C02F 101/36* | (2006.01) | |

(56) References Cited

U.S. PATENT DOCUMENTS

| | | | | |
|---|---|---|---|---|
| 2003/0028287 | A1 | 2/2003 | Puskas | |
| 2008/0264874 | A1* | 10/2008 | Bourgard | C02F 1/36 |
| | | | | 210/748.02 |
| 2009/0044626 | A1 | 2/2009 | Liu et al. | |
| 2010/0072134 | A1* | 3/2010 | Mader | B01J 19/008 |
| | | | | 210/205 |
| 2010/0089841 | A1 | 4/2010 | Mader et al. | |
| 2010/0126942 | A1* | 5/2010 | Thottathil | C02F 1/36 |
| | | | | 310/317 |
| 2011/0024361 | A1* | 2/2011 | Schwartzel | C02F 1/467 |
| | | | | 204/290.01 |
| 2011/0186155 | A1 | 8/2011 | Puskas | |
| 2019/0284073 | A1* | 9/2019 | Yost | C02F 9/00 |
| 2023/0264983 | A1* | 8/2023 | Meegoda | B06B 1/0607 |
| | | | | 210/748.04 |

FOREIGN PATENT DOCUMENTS

| | | | | | |
|---|---|---|---|---|---|
| WO | WO-2008109219 | A1 | * | 9/2008 | B01J 9/008 |
| WO | WO-2014060744 | A2 | * | 4/2014 | B06B 1/0207 |
| WO | WO-2020205635 | A1 | * | 10/2020 | C02F 1/34 |
| WO | WO-2022023597 | A1 | * | 2/2022 | B01J 19/10 |

OTHER PUBLICATIONS

CN-102372382-A-Translation (Year: 2012).*

WO-2005115925-A1 Translation (Year: 2005).*

Campbell, et al., "Perfluorinated Surfactant Chain-Length Effects on Sonochemical Kinetics," *J. Phys. Chem. A*, 113, 9834-9842, 2009. Retrieved from Internet on Jun. 22, 2021, at https://core.ac. uk/reader/4882531?utm_source=linkout.

Cheng, et al., "Sonochemical Degradation of Perfluorooctane Sulfonate (PFOS) and Perfluorooctanoate (PFOA) in Landfill Groundwater: Environmental Matrix Effects," *Environmental Science & Technology*, 42, 8057-8063, 2008.

Cheng, et al., "Sonochemical Degradation of Perfluorooctane Sulfonate (PFOS) and Perfluorooctanoate (PFOA) in Groundwater: Kinetic Effects of Matrix Inorganics," *Environmental Science & Technology*, 44, 445-450, 2010.

Gole, et al., "Treatment of Perfluorooctane Sulfonic Acid (PFOS) Using a Large-Scale Sonochemical Reactor," *Separation and Purification Technology*, 194, 104-110, 2018.

Gole, et al., "Sono-chemical Treatment of Per- and Polyfluoroalkyl Compounds in Aqueous Film Forming Foams by Use of a Large-Scale Multi-Transducer Dual-Frequency Based Acoustic Reactor," *Ultrasonics Sonochemistry*, 45, 213-222, 2018.

Hori, et al., "Efficient Decomposition of Perfluoroether Carboxylic Acids in Water With a Combination of Persulfate Oxidant and Ultrasonic Irradiation," *Journal of Fluorine Chemistry*, 141, 5-10. 2012.

Kalra, et al., Ultrasonic Nanobubbles Catalyzed Destruction of Per- and Polyfluoroalkyl Substances in Mixtures, Groundwater and, Investigation Derived Waste, *Emerging Contaminants Summit*, Student Presentations, The Westin Westminster, Westminster, Colorado, Mar. 10-11, 2020.

Kalra., et al., "Ultrasonic Nanobubbles Mediated Destruction of Per- and Polyfluoroalkyl Substances Mixtures in Groundwater," *Emerging Contaminants Summit*, Student Presentations, The Westin Westminster, Westminster, Colorado, Mar. 10-11, 2020.

Kalra, et al., "Biodegradation-Ultrasonolysis Treatment for the Destruction of Per- and Polyfluoroalkyl Substances in Mixtures," *Emerging Contaminants Summit*, Student Presentations, The West Westminster, Westminster, Colorado, Mar. 10-11, 2020.

Moriwaki, et al., "Sonochemical Decomposition of Perfluorooctane Sulfonate and Perfluorooctanoic Acid," *Environmental Science & Technology*, 39, 3388-3392, 2005.

Thi, et al., "Enhancing Decomposition Rate of Perfluorooctanoic Acid by Carbonate Radical Assisted Sonochemical Treatment," *Ultrasonics Sonochemistry*. 21, 1875-1880, 2014.

Rodriguez-Freire, et al., "Sonochemical Degradation of Perfluorinated Chemicals in Aqueous Film-Forming Foams," *Journal of Hazardous Materials*, 317, 275-283, 2016.

Shende, et al., "Kinetic Model for Sonolytic Degradation of Non-Volatile Surfactants: Perfluoroalkyl Substances," *Ultrasonics Sonochemistry*, 51, 359-368, 2019.

Vecitis, et al., "Sonochemical Degradation of Perfluorooctanesulfonate in Aqueous Film-Forming Foams," *Environmental Science & Technology*, 44, 432-438, 2010.

Vecitis, et al., "Enhancement of Perfluorooctanoate and Perfluorooctanesulfonate Activity at Acoustic Cavitation Bubble Interfaces," *J. Phys. Chem. C.*, 112, 16850-16857, 2008.

Vecitis, et. al., "Kinetics and Mechanism of the Sonolytic Conversion of the Aqueous Perfluorinated Surfactants, Perfluorooctanoate (PFOA), and Perfluorooctane Sulfonate (PFOS) into Inorganic Products," *J. Phys. Chem. A.*, 112, 4261-4270, 2008.

Yang, et al., "Effect of Vacuum ultraviolet on Ultrasonic Defluorination of Aqueous Perfluorooctanesulfonate," *Chemical Engineering Journal*, 234, 106-114, 2013.

Gole et al."Sona-chemical treatment of per- and poly-tluoroalkyl compounds in aqueous film-forming foams by use of a large-scale multi-transducer dual-frequency based acoustic reactor." *Ultrasonics—Sonochemistry* 45 (2018) 213-222, 2018.

International Search Report and Written Opinion issued in corresponding International Patent Application No. PCT/US2021 /021593, dated Dec. 17, 2021.

* cited by examiner

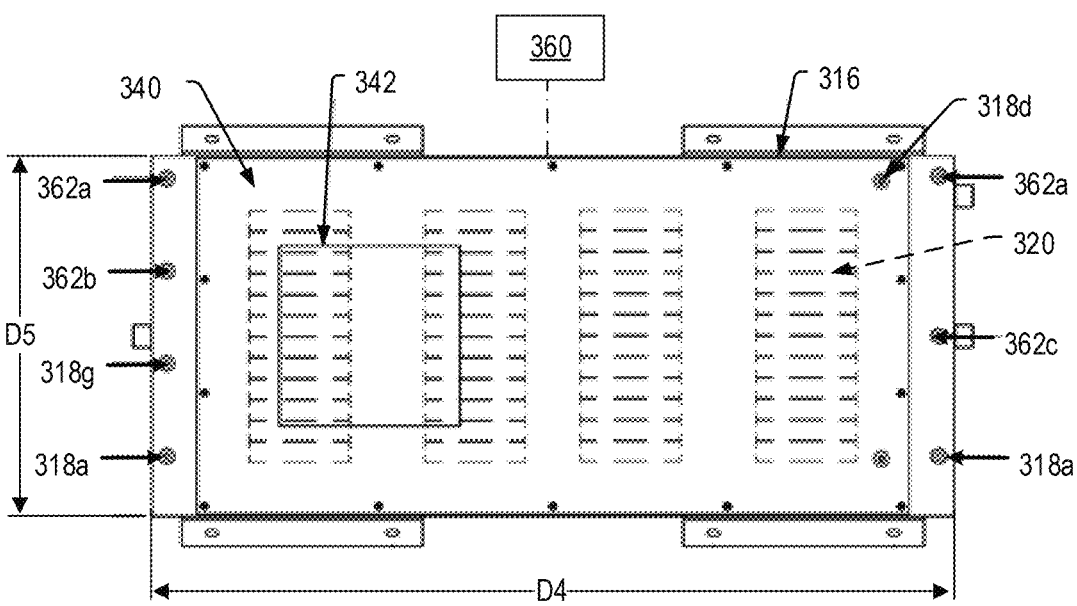
FIG. 3A
FIG. 3B

APPARATUS AND METHODS FOR SONOCHEMICAL DEGRADATION OF PER- AND POLYFLUOROALKYL SUBSTANCES

RELATED APPLICATION

The present application claims the benefit of U.S. Provisional Application No. 62/986,981 filed on Mar. 9, 2020.

STATEMENT REGARDING FEDERALLY SPONSORED RESEARCH OR DEVELOPMENT

This invention was made with government support under award #N3943018C2076, awarded by United States Naval Facilities Engineering and Expeditionary Warfare Center (NAVFAC EXWC). The government has certain rights in the invention.

FIELD OF INVENTION

The present disclosure relates generally to the destruction of per- and polyfluoroalkyl substances (PFASs), and more specifically, but not by way of limitation, to sonochemical destruction of PFASs in water.

BACKGROUND

PFASs are anthropogenic amphipathic heat resistant materials found in some household items and in Aqueous Film Forming Foams (AFFFs). PFASs are generated during various manufacturing processes in a variety of industries around the world, and as such, these chemicals are widespread in both the environment and the human body, via consumption of contaminated water or food. Recent studies have shown that exposure to PFASs can lead to adverse health outcomes in humans, such as cancer, thyroid hormone disruption, birth defects, and other effects on the immune system.

Conventional techniques to eliminate PFASs from impacted sources, such as drinking water, fail to actually destroy PFASs and merely recirculate the PFASs from one media to another. For example, granular activated carbon (GAC) and anion exchange resin (AIX) separate PFASs from drinking water. However, the spent GAC or AIX are often disposed in local landfills or are incinerated at temperature below 1000° C., which removes PFASs from spent sorbent but does not destroy the PFASs. Current PFAS destruction technologies (e.g., technology able to completely defluorinate PFASs to innocuous end products) typically require large amounts of energy and have exorbitant price tags. As such, there are limitations among the current techniques for decontaminating PFAS-impacted liquids.

SUMMARY

Aspects of the present disclosure describe methods, systems, and apparatuses for sonochemical degradation of a variety of PFASs, individually and in combination, from various aqueous solutions. For example, the present disclosure describes one or more devices configured for ultrasonic destruction of PFASs, and methods of use of such devices for PFAS degradation. To illustrate, a device may include a reactor having a housing that includes a base and one or more walls that cooperate to define a chamber. The device may include a transducer disposed within the chamber and configured to generate a plurality of sound waves to propagate through the chamber such that when the liquid is disposed within the chamber at least some of the one or more PFASs compounds are subjected to decomposition. In some implementations, a controller is coupled to the transducer and configured to actuate the ultrasonic elements to generate a first series of acoustic waves at a first frequency that is less than approximately 1200 kHz. Additionally, or alternatively, the controller is configured to actuate the ultrasonic elements so that a watt density of reactor is greater than 100 Watts per Liter (W/L)

In some implementations, the device may be sized and shaped for household and small-scale commercial use. For example, the chamber may have a working volume, such as maximum working volume, of less than 15 L. In other implementations, the device may be sized and shaped for industrial use. For example, the chamber may include a working volume that is greater than 50 L (e.g., greater than or equal to 59 L).

Some of the foregoing implementations include a controller coupled to the transducer and configured to actuate the transducer to generate a first series of acoustic waves at a first frequency. The acoustic waves at the first frequency may cause at least some of the one or more PFAS compounds disposed in the liquid to be subjected to decomposition. In some such implementations, the controller is configured to actuate to generate a first series of acoustic waves at a second frequency that may be the same as or different from the first frequency. In an illustrative example, the first frequency may be approximately 700 kilohertz (kHz) and the second frequency may be approximately 900 kHz. The devices, methods, and systems described herein may be configured for single and/or multi-frequency ultrasonic destruction of PFASs to decrease PFAS levels in a solution to less than or equal to a threshold. For example, the solution may have the PFASs level effectively decreased to less than 200 nanograms per liter (ng/L) or 0.2 parts per billion (ppb), and in some cases less than 70 ng/L (70 ppt).

In some implementations, a housing of a reactor may be shaped such that a chamber width that is at least 2 times the chamber height. In some such implementations, the chamber height is less than or equal 12 centimeters (cm). In such implementations, the height is controlled so that a depth of liquid disposed within the chamber may be minimized to increase the applied power density and ensure destruction of PFASs from the liquid. Additionally, or alternatively, the transducer may include a plate and a plurality of ultrasonic elements coupled to the plate. The plurality of ultrasonic elements may include a first set of one or more element, a second set of one or more elements, or a combination thereof. The first set of one or more elements may include or correspond to a first set of one or more piezoelectric elements that are each configured to generate the first series of acoustic waves at approximately 700 kHz. The second set of one or more elements may include or correspond to a second set of one or more piezoelectric elements that are each configured to generate a second series of acoustic waves at a second frequency.

In some implementations, the controller is configured to independently actuate each ultrasonic element, such as each of the plurality of piezoelectric elements. For example, the controller may be configured to actuate the first set of piezoelectric elements at a first time, actuate the second set of piezoelectric elements at a second time, or a combination thereof. The first time and the second time may be the same time or may be different times. In some implementations, a plurality of ports are coupled to and in fluid communication with the chamber, and at least one of the plurality of ports is configured to deliver a gas within the chamber.

As used herein, various terminology is used for the purpose of describing particular implementations only and is not intended to be limiting of implementations. For example, as used herein, an ordinal term (e.g., "first," "second," "third." etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes .1, 1, 5, and 10 percent.

The term "about" as used herein can allow for a degree of variability in a value or range, for example, within 10%, within 5%, or within 1% of a stated value or of a stated limit of a range and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" or "approximately" may be substituted with "within [a percentage] of" what is specified, where the percentage includes .1, 1, 5, or 10 percent. The statement "substantially X to Y" has the same meaning as "substantially X to substantially Y." unless indicated otherwise. Likewise, the statement "substantially X, Y, or substantially Z" has the same meaning as "substantially X, substantially Y, or substantially Z." unless indicated otherwise. The phrase "and/or" means and or or. To illustrate, A, B, and/or C includes: A alone, B alone, C alone, a combination of A and B., a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include-any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where". Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations. The terms "inhibiting" or "reducing" or "preventing" or "avoiding" or any variation of these terms, when used in the claims and/or the specification, include any measurable decrease or complete inhibition to achieve a desired result. The term "effective," as that term is used in the specification and/or claims, means adequate to accomplish a desired, expected, or intended result.

Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

FIG. 3A is a top view of another example of a reactor of a decontamination system.

FIG. 3B is a side view of the reactor of FIG. 3A.

DETAILED DESCRIPTION

Figure 1:
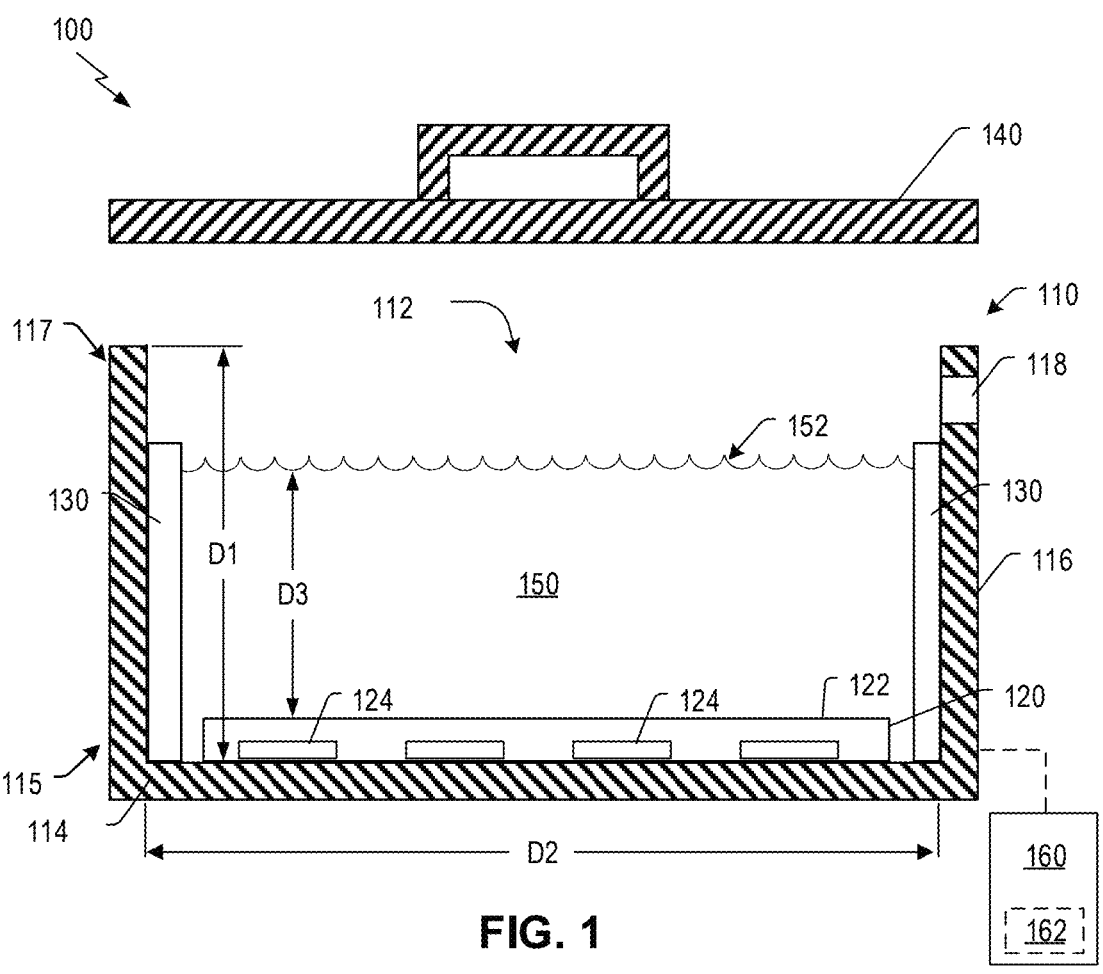
FIG. 1 is a cross-sectional view of an example of a reactor of a decontamination system filled with a liquid.

Referring to FIGS. 1, an illustrative view of a decontamination system including a sonochemical reactor 100 is shown. For example, FIG. 1 shows a cross-sectional view of reactor 100 of the decontamination system filled with a fluid (e.g., 150). Reactor 100 includes a housing 110, a transducer element 120 coupled to housing 110, and a controller 160. As shown and described herein, reactor 100 is configured to cause a chemical reaction within a fluid (e.g., 150). Specifically, reactor 100 may be configured to destroy Per- and Polyfluoroalkyl substances (PFASs) within liquid 150.

Housing 110 defines a reaction chamber 112 configured to receive fluid 150. Housing 110 includes a base 114 and one or more wall(s) 116 that cooperate to form chamber 112. As shown, base 114 defines a bottom surface of chamber 112 and wall(s) 116 extends outwardly and/or upwardly from the base to define side surfaces of the chamber. To illustrate, each wall 116 may extend from a first end 115 to a second end 117 to define the sides of chamber 212. Housing 110 may include a single (e.g., unitary) piece of material or may include multiple discrete components that can be coupled together to form housing 110. In some implementations, housing 110 includes a suitable rigid or semi-rigid material such as a metal, polymer, composite, and/or the like. For example, housing 110 may include polypropylene (PP), polyethylene (PE), high-density polyethylene (HDPE), polyvinyl chloride (PVC), polystyrene (PS), polymethyl methacrylate (PMMA), polyethyleneimine or polyetherimide (PEI), steel (e.g., stainless steels or alloys thereof), aluminum, or a combination or derivative thereof. In an illustrative implementation, base 114 includes a stainless steel and wall(s) 116 include polypropylene and/or high-density polyethylene.

In some implementations, housing 110 defines one or more ports 118. At least some of the ports 118 are configured to be in fluid communication with chamber 112 and may selectively permit introduction and/or evacuation of a fluid within the chamber. For example, port(s) 118 are configured to receive a pipe, tube, or other member defining a conduit so that a fluid (e.g., 150) may introduced into chamber 112. Port(s) 118 may be coupled to a pressure source (e.g., a pump) to selectively control the flow of fluid within the chamber.

Transducer element 120 may include a plate 122 and one or more elements 124, such as one or more ultrasonic elements, coupled to plate 122. Plate 122 may include a metal (e.g., stainless steel, aluminum, titanium, copper, or the like), a polymer, composite, ceramic, or other suitable material. In some implementations, plate 122 does not include a coating such as polytetrafluoroethylene (PTFE), that may include or contain PFASs compounds. For example, in the implementation depicted in FIG. 1, plate 122 is a non-coated aluminum plate coupled to an array of four elements 124, such as four piezoelectric transducers. In another implementation, plate 122 includes more than four elements 124 (e.g., transducers), such as, for example, greater than, equal to, or between any two of: 10, 20, 30, 40, 50 or 60 elements (e.g., approximately 48 transducers). Elements 124 may be arranged in any suitable pattern, such as, for example, in a rectangular grid pattern, diagonal pattern, circular pattern, combination thereof, or the like.

In some implementations, less than an entirety of elements 124 may be activated when reactor 100 is in operation. In this way, and others, one element (e.g., 124) does not have to be activated for the entire time the reactor is in operation. To illustrate, a first and second element (e.g., 124) may be activated and the first element may be deactivated while the second element remains activated. In some implementations, a third element may be activated when the first element is deactivated. Accordingly, elements 124 may be independently controllable to by reactor 100 or an operator thereof.

The elements 124 are configured to emit a series or plurality of sound waves, at least a portion of which enter or propagate though chamber 112. Each element 124 is configured to generate or emit sound waves having at least one frequency between approximately 250 kilohertz (kHz) and approximately 2000 kHz (e.g., such as equal to or between any two of 500, 600, 700, 800, 900, 1000, 1100, and 1200 kHz, or the like). In some implementations, transducer element 120 is configured to generate or emit sound waves from each element 124 at a single frequency. In such a single frequency operation, elements 124 produce soundwaves with frequencies that are within 10% (e.g., such as 5% or 2%) of the sound waves produced by the other ultrasonic elements. Additionally, or alternatively, transducer element 120 is configured to emit sound waves at multiple desired frequencies or combination of frequencies. For example, one or more first elements (e.g., 124) may produce sound waves at 700 kHz and one or more second elements (e.g., 124) may produce sound waves at 900 kHz. Each element 124 is configured to receive multiplexed signals such that the ultrasonic elements may be independently operated by a single source (e.g., controller 160). In some implementations, less than an entirety of elements 124 may be activated. For example, in an illustrative implementation, a first element is activated and one or more adjacent elements are not activated to reduce reflected losses. Although describes as piezoelectric, transducer element 120 and/or elements 124 may include an ultrasound head, or any other suitable transducer.

As shown, transducer element 120 is coupled to housing 110 and configured to generate a plurality of sound waves within chamber 112. As shown, transducer element 120 is disposed on a top surface of base 114, within chamber 112. In this manner and others, plate 122 may be in contact with a fluid (e.g., 150) disposed within chamber 112 and sound waves produced at element(s) 124 propagate through plate 122 to increase energy transfer to the fluid. In implementations where transducer element 120 is coupled to base 114, each element 124 may be oriented in the same direction to reduce reflected losses. Although described as being coupled to or disposed on base 114, in other implementations, transducer (e.g., one or more elements 124) may be disposed within chamber 112 on wall(s) 116, lid 140, base 114, or a combination thereof. Yet in other implementations, transducer element 120 may be coupled to an external surface of housing (e.g., a bottom surface of base 114) and disposed outside of chamber 112. In this manner, transducer element 120 may be accessible (e.g., removable or repairable) without disturbance to chamber 112.

In some implementations, reactor may include a cooling coil 130. Cooling coil 130 is configured to decrease, maintain, or otherwise regulate the temperature within chamber 112. As shown, cooling coil 130 may extend from base 114 along wall(s) 116. In some implementations, cooling coil 130 is coupled to one of the ports (e.g., 118) such that the cooling coil is configured to be liquid or air cooled. In an illustrative example, cooling coil 130 may include helical coils positioned around the perimeter of chamber 112 configured to transmit a fluid to increase heat transfer with chamber 112.

In some implementations, reactor 100 includes a lid 140 configured to be coupled to housing 110 to define chamber 112. Lid 140 may be releasably coupled to or otherwise attachable/attached to housing 110. In some implementations, lid 140 may be part of housing 110. Lid 140 may create a seal with housing 110 (e.g., wall(s) 116) such that chamber 112 is a closed system in which the pressure of the chamber may be increased or decreased relative to the ambient (e.g., atmospheric) pressure. To illustrate, lid 140 may be configured to create an air tight seal to prevent escape of gas from chamber 112 during operation. In other implementations, lid 140 may be removed from housing 110 such that chamber 112 is an open system during operation of reactor 100. Lid 140 may be removably coupled to housing 110 in any suitable manner, such as, fasteners, latches, friction (e.g., press fit), adhesive, and/or the like.

In the implementation shown in FIG. 1A, liquid 150 is disposed within chamber 112. However, in other implementations, reactor 110 may not include liquid 150 (e.g., liquid 150 may not be within chamber 112). Liquid 150 may be subjected to a chemical (e.g., sonochemical) reaction to change certain properties of the liquid. For example, liquid 150 may include water (e.g., wastewater, groundwater, deionized water, distilled water, drinking water, surface water, recycled water, reclaimed water, storm water, wastewater, AFFF stocks, AFFF wash water, Investigation-derived Waste (IDW), membrane retentate or permeate, effluent or eluent from a biological or abiotic water treatment process, or the like) impacted with Per- and Polyfluoroalkyl substances (PFASs), such as but not limited to carboxylates like, PFBA perfluoro-n-octanoic acid (PFOA), N-Et-FOSAA, N-McFOSAA, PFUdA, PFDA, PFNA, PFOA, PFHpA, PFHxA, PFPcA, sulfonates like, perfluoro-1-octanesulfonamide (FOSA-I), 1H,1H,2H,2H-perfluorooctane sulfonate (6:2FTS), 8:2FTS, 4:2FTS, PFPrA, PFPrS, PFDS, PFNS, PFHpS, PFHxS, PFPeS, perfluoro-1-octanesulfonate (PFOS), perfluoro-1-butanesulfonate (PFBS), N-(carboxymethyl) N,N-dimethyl-N-[3-(1H,1H,2H,2H-perfluoro-1-octanesulfonamido) propan-1-yl]ammonium (NCMAmp-6:2FOSA or 6:2 FTAB), a mix of 24 native PFAS (PFAC-24PAR), and perfluoroalkyl ether carboxylic (PFECAs) like 2,3,3,3-tetrafluoro-2-(heptafluoropropoxy) propanoic acid (GenX), 6:2FTAB, AFFF formulations, investigation-derived waste (IDW) liquids and/or the like.

As used herein, "PFAS" is used to describe a single chemical compound within the class of compounds known as "poly- and perfluoroalkyl substances" (also "poly- and perfluorinated substances" or "PFASs"). Example PFASs are provided in Table 1 below, which in non-exclusive. PFASs are described in more detail in, for example, Buck et al., Integr Environ Assess Manag, 7:513-541 (2011), incorporated herein by reference in its entirety. Additional lists of PFAS may be found at https://comptox.cpa.gov/dashboard/chemical liste/pfasmaster and https://www.epa.gov/toxics-release-inventory-tri-program/list-pfas-added-tri-ndaa.

TABLE 1

| Name | Chemical formula | Acronym |
|---|---|---|
| Perfluorobutanoic acid/perfluorobutanesulfonic acid | $F(CF_2)_3COOH/C_4HF_9O_3S$ | PFBA/PFBS |
| Perfluoropentanoic acid/ | $F(CF_2)_4COOH/C_5HF_{11}O_3S$ | PFPeA/PFPeS |

TABLE 1-continued

| Name | Chemical formula | Acronym |
|------|------------------|---------|
| perfluoropentanesulfonic acid | | |
| Perfluorohexanoic acid/ | $F(CF_2)_5COOH/C_6HF_{13}O_3S$ | PFHxA/PFHxS |
| perfluorohexanesulfonic acid | | |
| 5:2 Ketone | $F(CF_2)_5C(O)CH_3$ | 5:2 ketone |
| 6:2 Fluorotelomer unsaturated | $F(CF_2)_5CF=CHCOOH$ | 6:2 FTUCA |
| carboxylic acid | | |
| 6:2 Fluorotelomer carboxylic acid | $F(CF_2)_6CH_2COOH$ | 6:2 FTCA |
| 5:3 Acid | $F(CF_2)_5CH_2CH_2COOH$ | 5:3 acid |
| 4:3 Acid | $F(CF_2)_4CH_2CH_2COOH$ | 4:3 acid |
| 3:3 Acid | $F(CF_2)_3CH_2CH_2COOH$ | 3:3 acid |
| 6:2 Fluorotelomer alcohol | $F(CF_2)_6CH_2CH_2OH$ | 6:2 FTOH |
| 8:2 Fluorotelomer alcohol | $F(CF_2)_8CH_2CH_2OH$ | 8:2 FTOH |
| 5:3 Unsaturated acid | $F(CF_2)_5CH=CHCOOH$ | 5:3 Uacid |
| 5:2 Secondary alcohol | $F(CF_2)_5CH(OH)CH_3$ | 5:2 sFTOH |
| α-OH 5:3 Acid | $F(CF_2)_5CH_2CH(OH)COOH$ | α-OH 5:3 acid |
| 6:2 Fluorotelomer sulfate | $C_8H_5F_{13}O_4S$ | 6:2 Sulfate |
| 5:3 Polyfluoro thiol 2-hydroxy | $C_{11}H_9F_{11}O_4S$ | 5:3 THPA |
| propanoic acid | | |
| 5:3 Polyfluoro thiol keto ethanol | $C_{10}H_7F_{11}O_3S$ | 5:3 TKE |
| 5:3 Polyfluoro thiol keto 2-hydroxy | $C_{11}H_7F_{11}O_5S$ | 5:3 TKHPA |
| propanoic acid | | |
| 2,3,3,3-tetrafluoro-2- | $C_6H_1F_{11}O_3$ | GenX |
| (heptafluoropropoxy)propanoic acid | | |
| (HFPO-DA) | | |

Transducer element 120 is configured to emit sound waves that propagate through liquid 150 such that the liquid undergoes acoustic cavitation. During operation of reactor 100, the mechanical forces associated with the acoustic cavitation (e.g., high temperature and pressure variations of the generation and subsequent implosions of bubbles within the liquid) may cause pyrolysis of the chemical bonds of the PFASs. To illustrate, the collapse of bubbles generated by application of sound waves—such as acoustic or ultrasonic waves—to liquid 150 generates vapor temperatures above 3000 K that causes compounds near the bubble vapor to decompose via some combination of pyrolytic, reactive radicals, and hydrated electrons-mediated reactions. Accordingly, nonvolatile surfactants that resist oxidizing (e.g., PFASs), may decompose at the bubble-liquid interface. In this manner, reactor 100 may destroy the PFAS contaminants by separating the associated molecules into component atoms and ions.

Reactor 100 (e.g., housing 110) may be sized and shaped to facilitate the removal of PFASs from liquid 150. To illustrate, chamber 112 may include a height D1 that is measured between a top surface of base 214 to a second end of wall(s) 116 in a direction perpendicular to the base. Additionally, housing 110 includes a maximum transverse dimension D2 of chamber 112 (e.g., diameter) measured along a straight line from opposing portions of wall(s) 116. Housing 110 (e.g., base 114 and wall(s) 116) may be sized and shaped such that a maximum working volume of chamber 112 is between approximately 0.25 liters (L) and approximately 15 L (e.g., equal to or between any two of 0.25, 1, 2, 3, 4, 5, 10, 12, or 15 L). In this way and others, reactor 100 may be sized so that the watt density of reactor is relatively high (e.g., greater than 200 Watts per liter) to increase removal rates of PFASs with liquid 150. In some such implementations, the height D1 and maximum transverse dimension D2 of chamber 112 prevent liquid from having a volume where a maximum watt density of reactor 100 is insufficient to destroy PFASs.

For example, a depth D3 of liquid 150 or a volume of the liquid may be controlled based on a specified operation of reactor 100 to enhance removal rates of PFASs in the liquid. Depth D3 is measured from a surface of transducer to a surface of liquid 150 along a straight line. In the depicted implementations, depth D3 is measured from a top surface of plate 122 to a surface 152 of liquid 150 along a direction perpendicular to base 214. Depth D3 of liquid 150 may be controlled based on the operation of transducer and the type of PFAS contaminant within the liquid. To illustrate, for dual frequency operation of transducer element 120, a liquid (e.g., 150) having a smaller depth D3 provides better removal rates as compared to a liquid (e.g., 150) with a relatively greater depth. Alternatively, for single frequency operation of transducer element 120, the removal rates of PFASs in liquid 150 increase as depth D3 of liquid 150 increases until a maximum rate is achieved, after which a further increase in depth (e.g., D3) of the liquid leads to a decline in the removal rates.

In the depicted implementation, height D1 may be greater than or equal to approximately any one of, or between approximately any two of the following: 4.0, 4.5, 5.0, 5.5, 6.0, 7.0, 8.0, 9.0, 10.0, 12.0, 15.0, 20.0, or 25.0 cm. Additionally, or alternatively, maximum transverse dimension D2 may be greater than or equal to approximately any one of, or between approximately any two of the following: 10, 15, 20, 25, 30, 35, 40, 45, 50, 55, 60, 65, 70, 75, 80, 90, or 100 cm. In some implementations, maximum transverse dimension D2 is greater than (e.g., 10% greater than) height D1 so that depth D3 of liquid 150 may be minimized without significantly reducing the amount of liquid 150 that can be treated during operation of reactor 100. In an illustrative example, maximum transverse dimension D2 can be greater than or equal to or between any two of: 150%, 200%, 250%, 300%, 350%, 400%, 450%, 500%, 550%, 600%, 650%, 700%, 750%, or greater of height D1 of chamber 112. Additionally, or alternatively, depth D3 of liquid 150 may be less than or equal to or between any two of 15.0, 12.0, 10.0, 8.0, 6.0, 5.5, 5.0, 4.5, 4.0, 3.5, 3.0, 2.5, 2.0, 1.5, 1.0, 0.5, or 0.25 cm. Accordingly, during operation of reactor the watt density of transducer and liquid 150 may be greater than or equal to 500 watts/liter (e.g., greater than 600, 800, 1000, or 1300 watts/liter). Consequently, height D1 and maximum transverse dimension D2 of chamber 112 may be selected to facilitate enhanced removal rates of PFASs. In this manner and others, reactor 100 may provide a household device for PFASs decontamination of drinking water that is currently unavailable.

In the depicted implementation, chamber 112 has a circular cross-sectional shape so maximum transverse dimension D2 is equal to a diameter of the chamber. Yet, in other implementations, chamber 112 may have a rectangular, circular, elliptical, triangular, octagonal, and/or any other suitable cross-sectional shape. In such implementations, maximum transverse dimension D2 defines the maximum distance of chamber measured along a straight line from opposing portions of wall(s) 116 (e.g., from corner to corner in rectangular implementations). As volume is measured three dimensionally, maximum transverse dimension D2 of chamber 112 may be selected to increase an area of base 114 so that height D1 of chamber 112 is minimized with respect to the volume of the chamber. In other implementations, an area of base may be better measure using a length and width, which may be selected in the same manner with respect to maximum transverse dimension D2, as described above.

In some configurations, reactor 100 may be configured for large-scale, or industrial, use. In such configurations, chamber 112 has a maximum working volume that is greater than 30 liters (L). For example, the maximum working volume of chamber 112 may be greater than, equal to or between any two of: 40, 45, 50, 55, 60, 65, 70, 75, 80, 85, 90, 95, 100, 110 L. In an illustrative, non-limiting example, chamber 112 may define a rectangular cross sectional shape having a length of 36 inches, a width of 20 inches, and a height (e.g., D1) of at least 6 inches. In some configurations, chamber 112 may have one or more markings to indicate a depth (e.g., D3) of a liquid disposed within the chamber 112. For example, an interior of walls 116 may include a marking at specific intervals (e.g., 1" (inch), 2", 3", 4", 5"). In such industrial scale reactors (e.g., 100), transducer element 120 may be configured to have sufficient power such that a watt density of transducer and liquid 150 may be at least greater than 100 watts/liter for the maximum working volume. In an illustrative, non-limiting example, transducer element 120 may have an operating power of 7200 W corresponding to a watt density of 122 W/L for the 5" level (59 L), 153 W/L for the 4" level (47.2 L), 203 W/L for the 3" level (35.4 L), 305 W/L for the 2" level (23.6 L), and 610 W/L for the 1" level (11.8 L). In some such reactors a horizontal dimension of reactor 100 (e.g., width or length) may be greater than a vertical dimension (e.g., height D1). For example, one of width or length may be at least 10, 15, 25, 50, 75, 100, 125, 150, 175, 200, 250, 300, 350, 400, 450, or 500% greater than a height of the reactor. Such sizing may allow a ratio of liquid depth (e.g., height) to liquid volume to be minimized within chamber 112. Additionally, this may allow an area of transducer element 120 to be maximized. In this way, and others, reactor 100 may provide higher and more uniform rates of degradation.

Controller 160 is configured to control one or more components of the system, such as controlling emittance of soundwaves from transducer element 120, cooling of chamber 112, introduction or extraction of fluid to the chamber, and/or the like. Controller 160 may be able to initiate operation(s) of transducer element 120, ports 118 (e.g., via a pressure source attached to the port), cooling coil 130, and/or other components of reactor 100, to perform the functions of the system as described herein. In some implementations, controller 160 may include one or more sensors 162. Such sensor(s) 162 may monitor a temperature (e.g., thermocouple), pressure, fluid level, flow rate, humidity, other parameter, or a combination thereof. Sensor 162 may be coupled to controller 160 and the controller may be configured to perform or initiate operation(s) based on the sensor data.

In an illustrative, non-limiting example, controller 160 may be configured to operate transducer element 120 at single frequency (e.g., 700 kHz or 900 kHz), or at a combination of multiple frequencies (e.g., 700 kHz and 900 kHz). In some implementations, controller 160 is configured to operate element(s) 124 at a frequency less than approximately 1000 KHz.

In some implementations, controller 160 is a multiplexer that is configured to operate multiple elements 124 independently. For example, controller 160 is configured to individually tune each element 124 to emit acoustic waves based on the optimum frequency of the specific element. In this way and others, controller 160 is configured to individually tune each element 124 for enhanced frequency match of transducer element 120. In an illustrative example, for 700 kHz single frequency operation of reactor 100, controller 160 may operate each element 124 at a frequency within 10% of 700 kHz (e.g., 665 to 735 kHz) that corresponds to an optimum frequency of the respective ultrasonic elements. Additionally, or alternatively, a first set of elements (e.g., 124) may be actuated at a first time and a second set of elements (e.g., 124) may be actuated at a second time. Second time may occur after first time such that elements 124 may be actuated sequentially or alternatively). In some implementations, the first set of elements (e.g., 124) may emit sound waves at the same (e.g., within 5%) or at a different frequency as the second set of elements (e.g., 124). In this way and others, controller 160 may decrease or eliminate sound cancelation of the elements 124, and in some implementations, may be configured to increase constructive interference.

In some implementations, controller 160 may be configured to control an input and/or output of fluid (e.g., via a pump or other pressure source) within chamber 112. For example, controller may introduce liquid 150 from a larger liquid source at a predetermined depth D3 that may be selectable by an operator. Additionally, or alternatively, controller may discharge liquid 150 from chamber 112 after operation of reactor 100. For example, controller maybe configured to receive one or more inputs (e.g., type of PFAS and/or type of water) and subsequently select operational parameters that correspond to the highest reaction rate for the inputs. To illustrate, controller 160 may determine a type of water and type of PFAS contaminant and select an operation mode (e.g., single frequency or multi-frequency) of reactor 100, a frequency range of elements 124, a volume of liquid and/or depth of liquid to be dispensed within chamber 112, or combination thereof. In this way and others, reactor 100 may be able to operate transducer for enhanced destruction of PFASs within a liquid (e.g., 150).

Controller 160 may be physically or wirelessly coupled to one or more of the other components of reactor 100 and configured to control operation of the system via one or more user-initiated or automatic commands or parameters. In some embodiments, controller 160 may include a processor (e.g., a microcontroller/microprocessor, a central processing unit (CPU), a field-programmable gate array (FPGA) device, an application-specific integrated circuits (ASIC), another hardware device, a firmware device, or any combination thereof) and a memory (e.g., a computer-readable storage device) configured to store instructions, one or more thresholds, and one or more data sets, or the like. The instructions of the memory may be executable by the processor to perform or initiate one or more operations or functions as described herein. In some embodiments, controller 160 may include one or more interface(s), one or more I/O device(s), a power source, one or more sensor(s), signal generator (e.g., RF generator), or combination thereof. For example, controller 160 may include an I/O device that allows a user to input information (e.g., desired frequency) to control the operation of reactor 100.

Figures 2A, 2B:
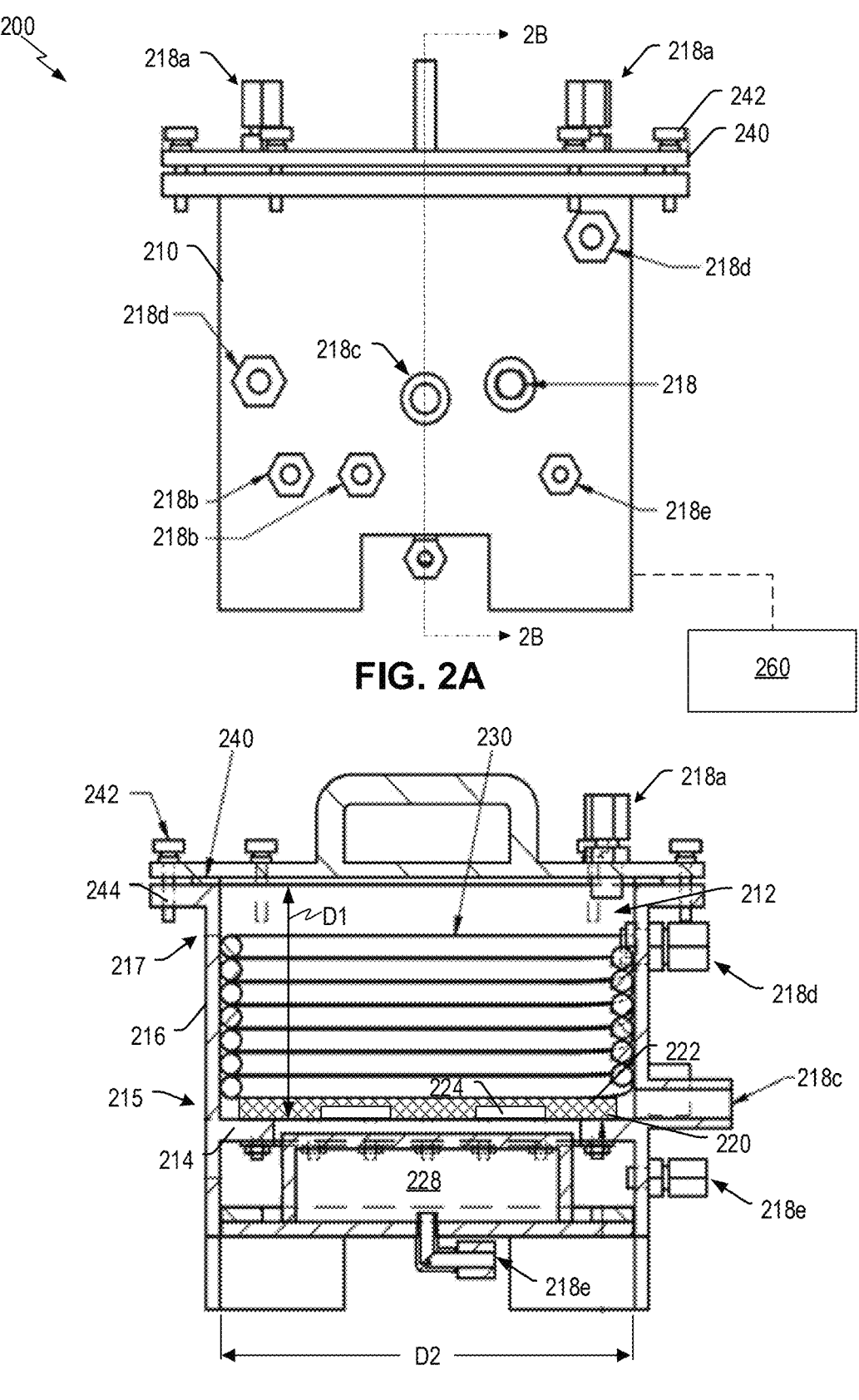
FIG. 2A is a side view of another example of a reactor of a decontamination system.
FIG. 2B is a cross-sectional view of the reactor of FIG. 2A along the line 2B-2B.

Referring now to FIGS. 2A and 2B, examples of a reactor 200, such as a sonochemical reactor, are shown. FIG. 2A shows a side view of reactor 200 and FIG. 2B shows a cross-sectional view of the reactor 200 taken along line 2B-2B. Reactor 200 may include or correspond to reactor 100. Reactor 200 includes a housing 210, a transducer 220, and a controller 260 that may include or correspond to one or more aspects of housing 110, transducer element 120, and controller 160, respectively. For example, housing 210 includes a base 214 and one or more wall(s) 216 that cooperate to form a chamber 212.

Housing 210 may define a plurality of ports 218, such as one or more inlets and one or more outlets. As shown in FIG. 2A, at least one of ports (e.g., 218) may comprise one or more gas communication port(s) 218a that is in fluid communication with chamber 212. Port(s) 218a may be configured to introduction and/or remove gas from chamber 212. For example, housing may include a pair of ports (e.g., 218a) one of which is configured to introduce gas into chamber 212 and the other is configured to remove gas from the chamber. In an illustrative example, ports 218a are configured to (e.g., via a pressure source) introduce an inert gas within chamber 212 during operation. In some such implementations, ports 218a are configured to introduce Argon into the chamber to saturate a liquid (e.g., 150) within the chamber. In this way and others, bubbles produced during acoustic cavitation may provide increased heat transfer during the collapse of the bubbles, thus enhancing pyrolytic reactions in the liquid. In some implementations, at least one of the ports comprises an electrical port 218b configured to enable one or more electrical components to extend though housing 210. For example, electrical port(s) 218b may enable transducer 220, one or more sensors (e.g., 162) or a combination thereof, to receive power from an external power source. Additionally, or alternatively, ports (e.g., 218) may define a sampling port 218c that is configured to selectively be in fluid communication with chamber 212. Sampling port 218c may selectively permit extraction of a liquid (e.g., 150) within chamber 212. In this way, the liquid (e.g., 150) may be easily monitored to check for contamination, or other characteristics, of the fluid without having to access chamber 212. Although described as having ports 218a-e, reactor 200 may have fewer ports or may have more ports. For example, reactor 200 may have a port (e.g., 218) configured to introduce and/or drain a liquid (e.g., 150) from chamber 212. In some such implementation, reactor 200 may include one or more valves, switches, fluid sources, air compressors, or other components coupled to ports 218 to control operation of the ports or the reactor.

In the implementation depicted in FIG. 2B, reactor 200 includes a cooling element 230 disposed within chamber 212. As shown, cooling element 230 comprises a helical coil wrapped around the perimeter of chamber 212. Cooling element 230 may be coupled to a cooling port 218d such that gas or liquid may be supplied through the cooling element to increase heat transfer (e.g., conduction) of the cooling element. For example, water or other coolant may be supplied through cooling element 230 during operation of reactor 200 to maintain temperature of chamber 212. In some implementations, housing defines a cavity 228 that may facilitate thermal management of chamber 212. In the depicted implementations, cavity 228 is disposed below chamber 212 to allow cooling of base 214 or transducer 220. To illustrate, port(s) 218e may be in fluid communication with cavity 228 to enable airflow within the cavity. In this way and others, cavity 228 may facilitate thermal management (e.g., via convection) of base 214 and/or transducer 220 to prevent overheating of reactor 200.

As shown in FIGS. 2A and 2B, lid 240 may, but need not, be coupled to housing 210 via one or more fasteners 242. In the depicted implementation, each of lid 240 and housing 210 define one or more corresponding apertures 244 that are configured to receive a fastener 242 to couple the lid to the housing and provide airtight operating conditions in a completely closed system while holding the pressure for extended periods. In some such implementations, lid 240 may prevent a gas (e.g., argon or the like) from escaping chamber 212, resulting in the increased availability of radical intermediates in the reaction. However, in other implementations, lid 240 maybe secured to housing 210 in any suitable manner such as, for example, bolts, screws, hinge, snap fit, latch, or any other connector known in the art. In this way and others, reactor 200 may increase pyrolytic reaction in a liquid (e.g., 150), thus increasing the removal rates of PFASs.

As shown in FIG. 2B, base 214 and wall(s) 216 define chamber 212. In the depicted implementation, base 214 may be substantially planar member that defines the bottom surface of chamber 212; however, in other implementations, base 214 may be curved, angled, or otherwise shaped. Wall(s) 216 project outwardly from the base and extend from a first end 215 to a second end 217 to define sidewalls of chamber 212. Chamber 212 includes a height D1 measured between a top surface of base 214 and second end 217 of wall(s) 216 in a direction perpendicular to the base and a width D2 measured along a straight line from opposing portions of wall(s) 116. The height and width of chamber 212 may be sized similarly to that of chamber 112 to enhance removal rates of PFASs of a liquid disposed within the chamber. As shown, transducer 220 include a plate 222 coupled to a plurality of ultrasonic elements 224 and is disposed on a top surface of base 214 to transmit sound waves within chamber 212. Controller 260 may be electrically coupled to transducer 220 to operate the transducer as described herein.

Referring now to FIGS. 3A and 3B, an example of a reactor 300, such as a sonochemical reactor, are shown. FIG. 3A shows a top view of reactor 300 and FIG. 3B shows a side view of the reactor 300 taken. Reactor 300 may include or correspond to reactor 100. Reactor 300 includes a housing 310, a transducer 320, and a controller 360 that may include or correspond to one or more aspects of housing 110, transducer element 120, and controller 160, respectively. For example, housing 310 includes a base 314 and one or more wall(s) 316 that cooperate to form a chamber 312.

In the implementation depicted in FIGS. 3A and 3B, base 314 is a substantially planar member that defines a bottom surface of chamber 312; however, in other implementations, base 314 may otherwise shaped. Base 314 includes a length D4 and a width D5 that is measured perpendicular to the length, each of the length and width being measured from opposing ends of the base. Length D4 may, but need not be, greater than width D5. In an illustrative example, length D4 may be greater than or equal to approximately any one of, or between approximately any two of the following: 40, 45, 50, 55, 60, 65, 70, 75, 80, 85, 90, 95, 100, 105, 110, 115, 120, 125, or 150 cm (e.g., approximately 101 cm). Additionally, or alternatively, width D5 may be greater than or equal to approximately any one of, or between approximately any two of the following: 30, 35, 40, 45, 50, 55, 60, 65, 70, 75, 80, 90, or 100 cm (e.g., approximately 46 cm). As shown in FIG. 3B, walls 316 extend from base 214 (e.g., in a direction perpendicular to the base) to define chamber 312. Walls 316 include a height D1 that corresponds to a height of chamber 312. Height D1 may be may be greater than or equal to approximately any one of, or between approximately any two of the following: 3, 5, 10, 12, 15, 18, 20, 25, 30 or 35 cm. In some implementations, at least one of length D4 and width D5 is greater than height D1. For example, length D4 and/or width D5 may be at least 10, 25, 50, 75, 100, 150, 200, 250, 300, 350, 400, 450, 500, 600, 700, 800, 900, or 1000% greater than a height of the reactor. In some implementations, reactor 300 may include a working volume that is greater than or equal to 40, 45, 50, 55, 60, 65, 70, 75, 80, 85, 90, 95, 100, 110, 125, or 150 liters.

Transducer 320 may be coupled to the base and include a plurality of ultrasonic elements (e.g., piezoelectric elements). As shown, the elements are arranged in a rectangular grid-like pattern, however, in other implementations, the elements may be arranged in any other suitable pattern. In some implementations, reactor 300 may include a lid 340 (e.g., cover) coupled to walls 316. Lid 340 may include a window 342 that allows an operator to visually inspect chamber 312 while the lid is coupled to base 314. As shown, reactor 300 may include one or more ports (e.g., 318). The ports may be defined by base 314, walls 316, and/or lid 340. As an illustrative, non-limiting example, reactor can include gas communication port(s) 318a that is in fluid communication with chamber 312 and are configured to introduce or remove gas from the chamber. Additionally, or alternatively, reactor 300 may define a sampling port 318c that is configured to selectively be in fluid communication with chamber 312. In some implementations, reactor 300 may define a cooling port 318d such that gas or liquid may be supplied through a cooling element to increase heat transfer in chamber 312. Additionally, or alternatively, reactor 300 can include an overfill port 318f in fluid communication with chamber 312 and configured to release liquid within the chamber if a height (e.g., depth D1) of the liquid is too high. Reactor 300 may also include a relief port 318g (e.g., pressure relief valve) that may be activated to allow air to flow into and out of chamber 312.

In the depicted implementation, reactor may include one or more sensors 362 (e.g., sensors for temperature, pressure, fluid level, flow rate, humidity, other parameter, or a combination thereof). Sensors 362 may be coupled to a controller 360 and the controller may be configured to perform or initiate operation(s) based on the sensor data. As a non-limiting illustrative example, reactor may include one or more temperature sensors 362a, a pressure sensor 362b, and a liquid level sensor 362c configured to measure a depth (e.g., D3) of liquid in chamber 312. It should be understood that not all depicted sensors (e.g., 362a-362c) are required, and one or more other non-depicted sensors may be included.

Figure 4:
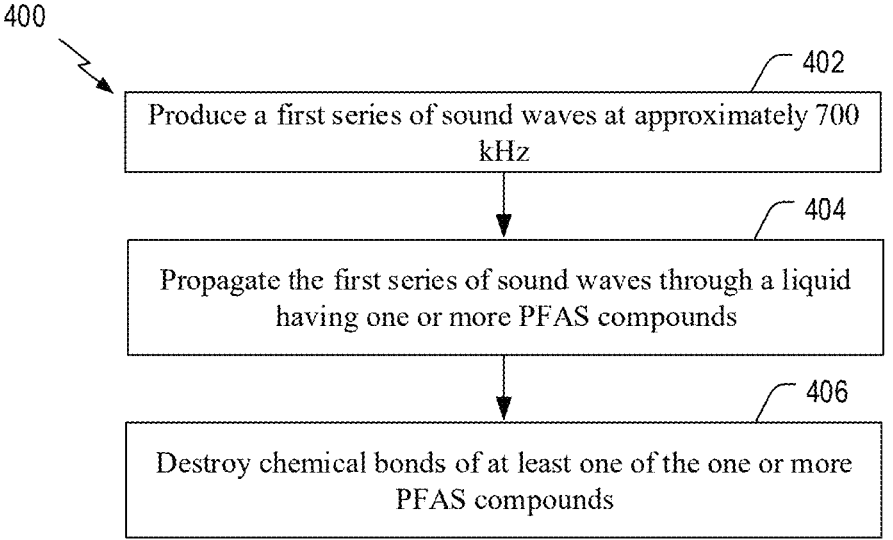
FIG. 4 is a flowchart of an example of a method of operating a reactor of the decontamination system.

Referring now to FIG. 4, a method of destroying PFASs is shown. Method 400 may be performed by reactor 100, 200, 300 as illustrative, non-limiting examples. Method 400 includes operating a reactor for degradation of PFASs. The reactor may include or correspond to reactor 100, 200, 300. Method 400 includes producing a first series of sound waves, at 402. The first series of soundwaves may be produced by transducer element 120, 220. The first series of soundwaves include a frequency of approximately 700 kHz.

Method 400 also includes propagating the first series of sound waves through a liquid having one or more PFAS compounds at 404.

Method 400 includes destroying chemical bonds of at least one of the one or more PFASs compounds at 406. In some methods destroying chemical bonds of at least one of the one or more PFASs compounds comprises degrading an amount of PFAS in the liquid below 200 ng/L (e.g., such as less than 100 ng/L or 70 ng/L).

Method 400 may also include producing a second series of sound waves at a second frequency. The second frequency may be the same as or different than the first frequency. For example, the second frequency may be approximately 900 kHz. Some methods include introducing an inert gas into the chamber. For example, argon gas may be sparged within chamber to saturate the liquid.

In some implementations, method 400 may include introducing the liquid within the chamber such that the liquid is a first depth. For example, liquid may be introduced within chamber at a depth of any one of or between any two of: 0.03, 0.05, 0.075, 1.0, 1.25, 1.5, 2.0, 2.5, 3.0, 3.5, 4.0, 4.5, 5.0, 5.5, 6.0, 6.5, 7.0, or 7.5 cm. Some methods include, based on the first depth being greater than or equal to a predetermined depth, propagating the second series of soundwaves at approximately 700 kHz. Additionally, or alternatively, based on the first depth being less than or equal to the predetermined depth, propagating the second series of soundwaves at approximately 900 kHz. Some methods include actuating the first set of ultrasonic elements and the second set of ultrasonic elements alternatively. Some of the foregoing methods may be performed at or by a control system (e.g., controller 160, 260).

EXAMPLES

The present implementations will be described in greater detail by way of specific examples. The following examples are offered for illustrative purposes only and are not intended to limit the implementations in any manner. Those of skill in the art will readily recognize a variety of noncritical parameters that can be changed or modified to yield essentially the same results.

Example 1—PFBS Ultrasonic Degradation in Different Conditions

Figure 5A:
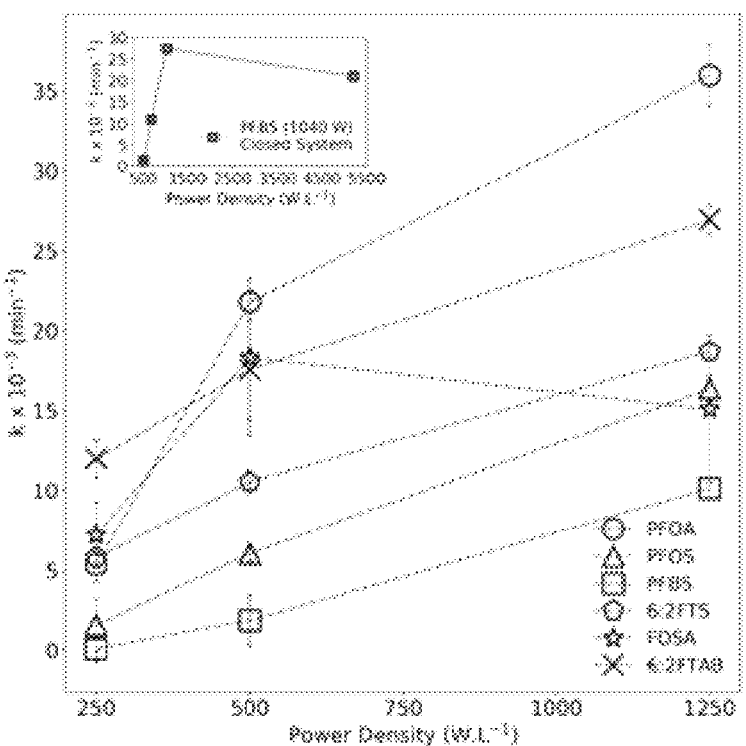
FIGS. 5A and 5B are graphs showing observed first-order kinetics of six different PFASs with changing power density (Pa) (or water column height) and system conditions at 700 kHz and 900 kHz.

Deionized (DI) water was amended with 6 PFASs at 10 ppb and a desired volume of the water solution was disposed within the chamber of a reactor operating at 700 kHz for a 250 W open system and a 700 kHz-1040 W closed system. The volume of the water solution was adjusted based on the wattage to arrive at a power density of 150, 500, and 1250 W/L. FIG. 5A shows variation in pseudo-first-order removal rates of PFASs with changing power density (or water column height) and system conditions. As shown, the removal rate constant decreased significantly as the power density decreased (or the water volume (e.g., depth) increased). Each water sample illustrated a similar relationship between volume and reaction rates, with the rate constant being inversely related to the volume. Thus, increasing the volume of the water solution typically has a negative impact on degradation of PFAS and conventional reactors are ill-equipped to process large volumes of PFAS impacted water.

Figure 5B:
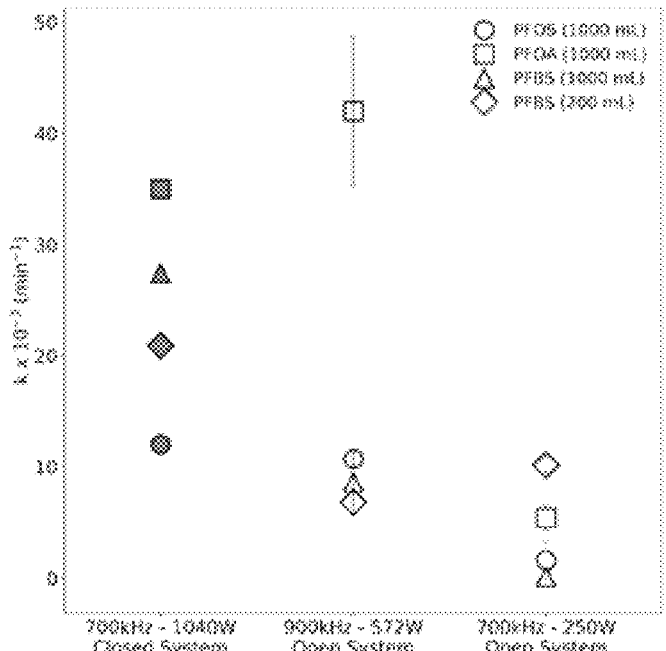

As shown in FIG. 5B, the reaction rate constant (K) was calculated using the first 120 min, based on the initial rate method, for each configuration. Each PFOS, PFOA, PFBS was tested using 1000 mL (1 L) of water solution and PFBS was also tested using 200 ml of water solution. The degradation rates of PFASs were recorded for a 700 kHz closed system operating at 1040 W, a 900 kHz open system in which gas (e.g., Argon) was allowed to escape at 572 W, and a 700 kHz open system operating at 250 W. The solid marker represents a closed system while the empty marker represents an open system. The closed system produced rates better than the open system at the same frequency. Rates of PFBS are higher at 700 kHz as compared to 900 kHz and vice versa is true for PFOA.

Figure 6A:
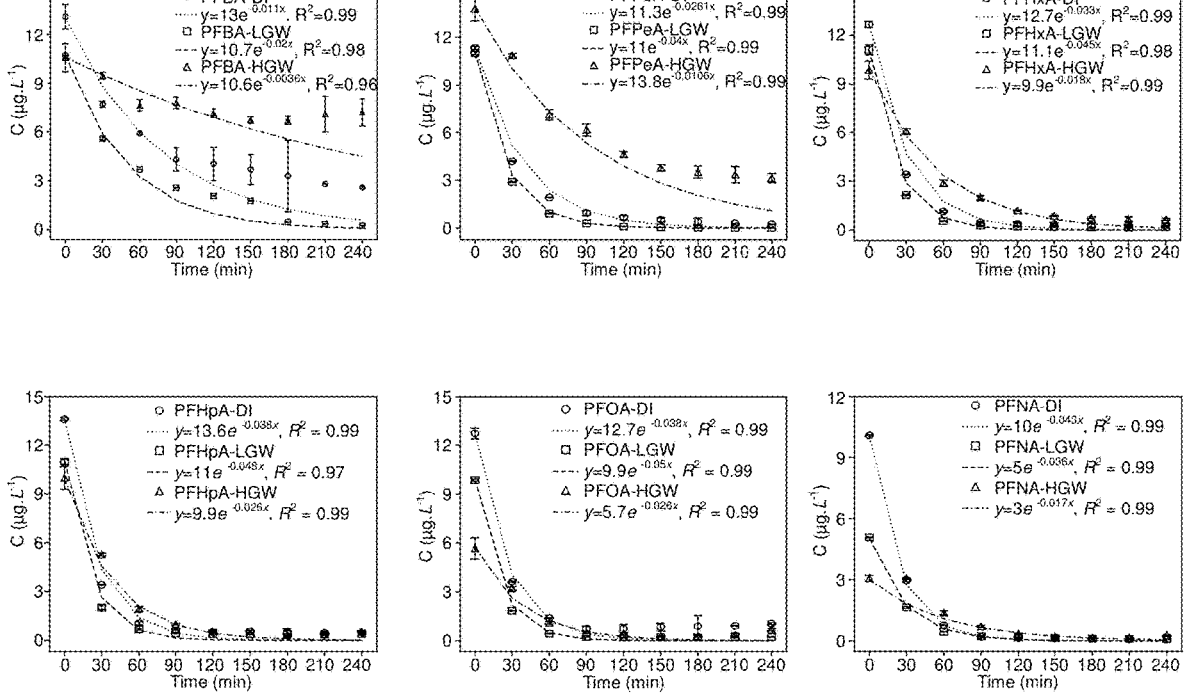
FIGS. 6A and 6B are graphs showing the observed first-order kinetics of 24 different PFASs in deionized water and two different groundwaters spiked with 24 mix of PFASs at 700 kHz.
Figure 6A:
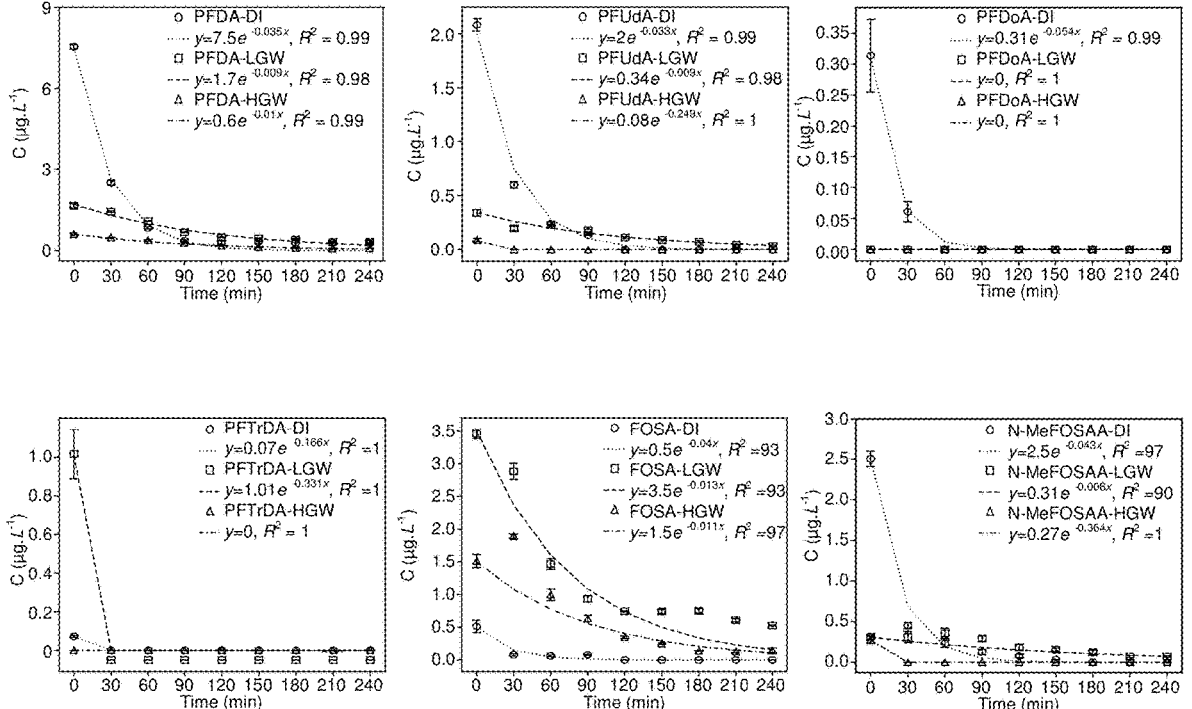
Figure 6B:
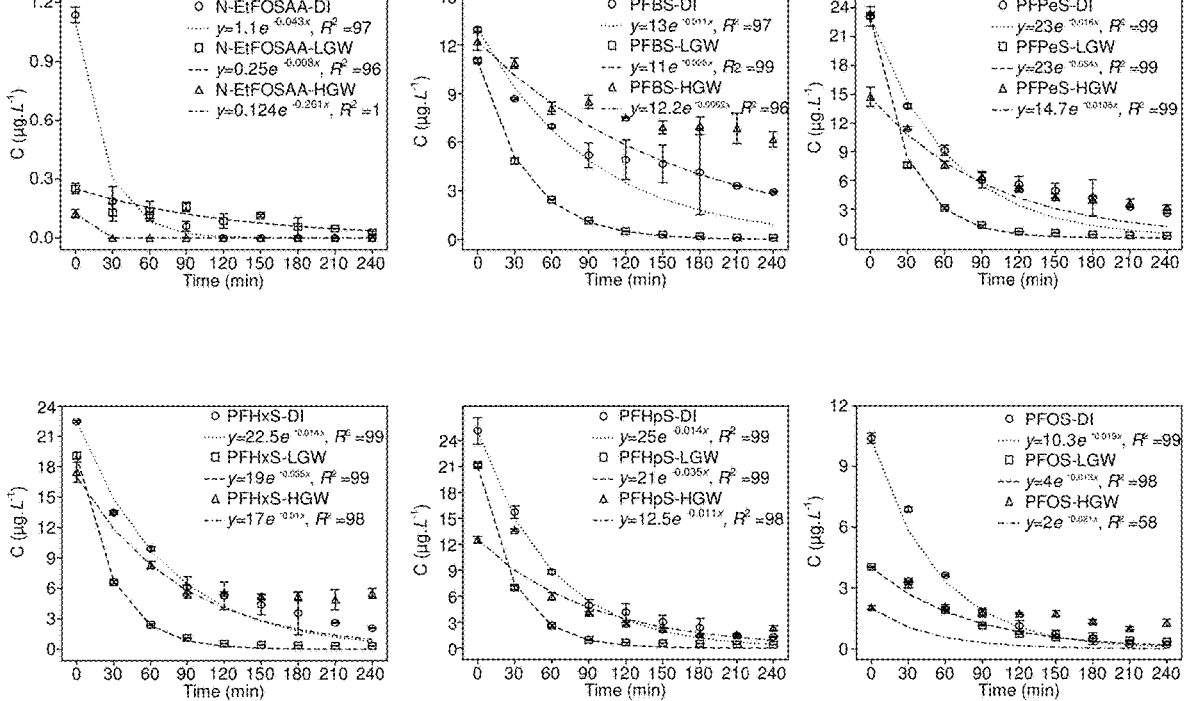
Figure 6B:
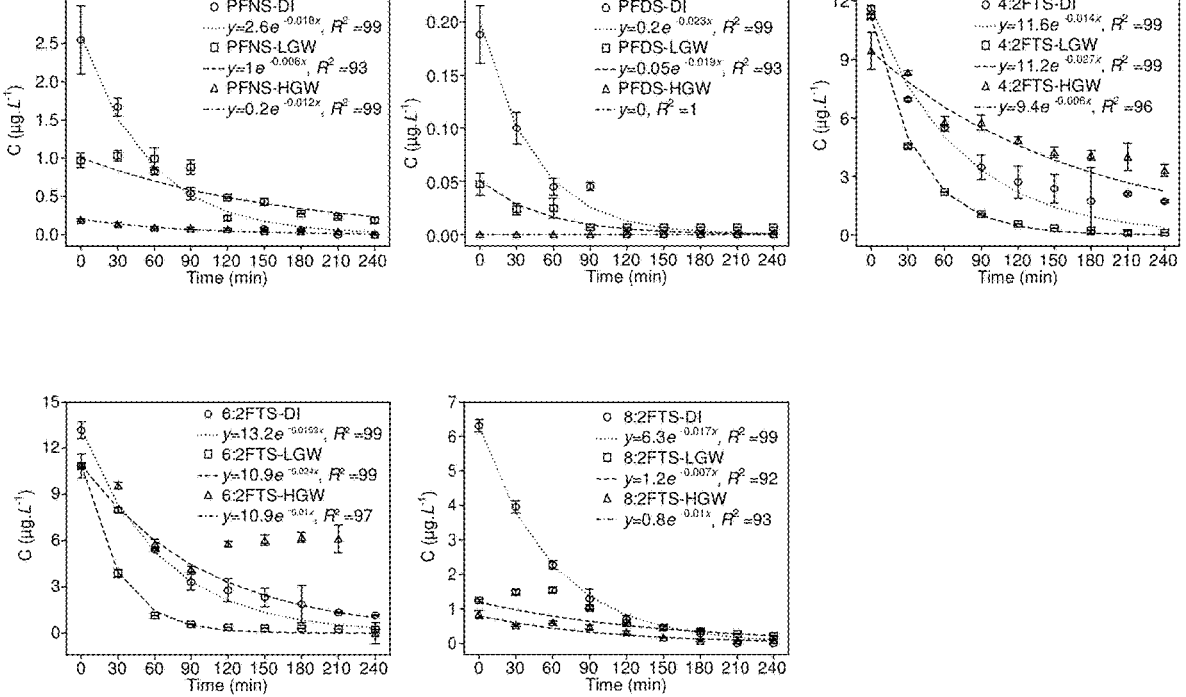
Figure 6C:
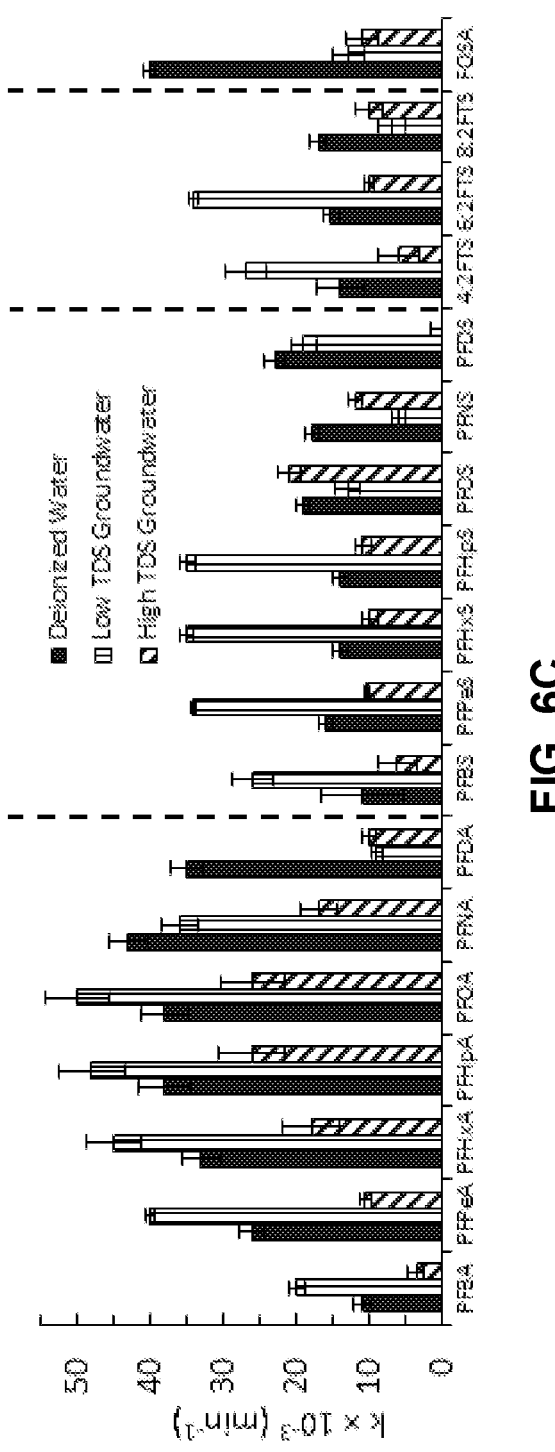
FIG. 6C is a graph showing a comparison of removal rates of 18 different PFASs of the 24 PFASs of FIGS. 6A and 6B.

Example 2—Comparison of PFAS Destruction Rates by the Ultrasonic Reactor in Different Water Matrices Pseudo-first-order removal of 24Mix in deionized water, low TDS groundwater, and high TDS groundwater using a 700 kHz-250 W open system ($P_d$=1250 W/L). The reaction rates for 24 PFASs in deionized water were compared to those measured in samples of low TDS groundwater and high TDS groundwater. The comparison of Pseudo-first-order removal rates (k) of 24Mix in deionized water, low TDS groundwater, and high TDS groundwater demonstrates that increasing degradation rates with increasing chain length. The degradation rates of sulfonates and short-chain PFASs (C<8) were higher in the low TDS groundwater while high TDS groundwater inhibits the degradation of PFASs. The results of these studies are shown in FIGS. 6A-6C. FIGS. 6A and 6B depict the degradation of 23 of the 24 PFAS for 240 minutes using the reactor in Argon saturated atmosphere at 10° C. and FIG. 6C depicts the observed rate constants for 18 different PFASs for the first 120 minutes using the initial rate method. In FIGS. 6A and 6B, error bars represent standard deviation of triplicates, while in FIG. 6C, error bars represent standard deviation of analytical duplicates. Significant increases in rates of removal for shorter chain PFAS were observed in groundwater when compared to the removal rates in deionized water; however, the effect was opposite for longer chain compounds. The PFAS destruction rates were found to be significantly dependent on groundwater chemistry with a high salinity of water correlating to the decrease in destruction rates.

Figure 7A:
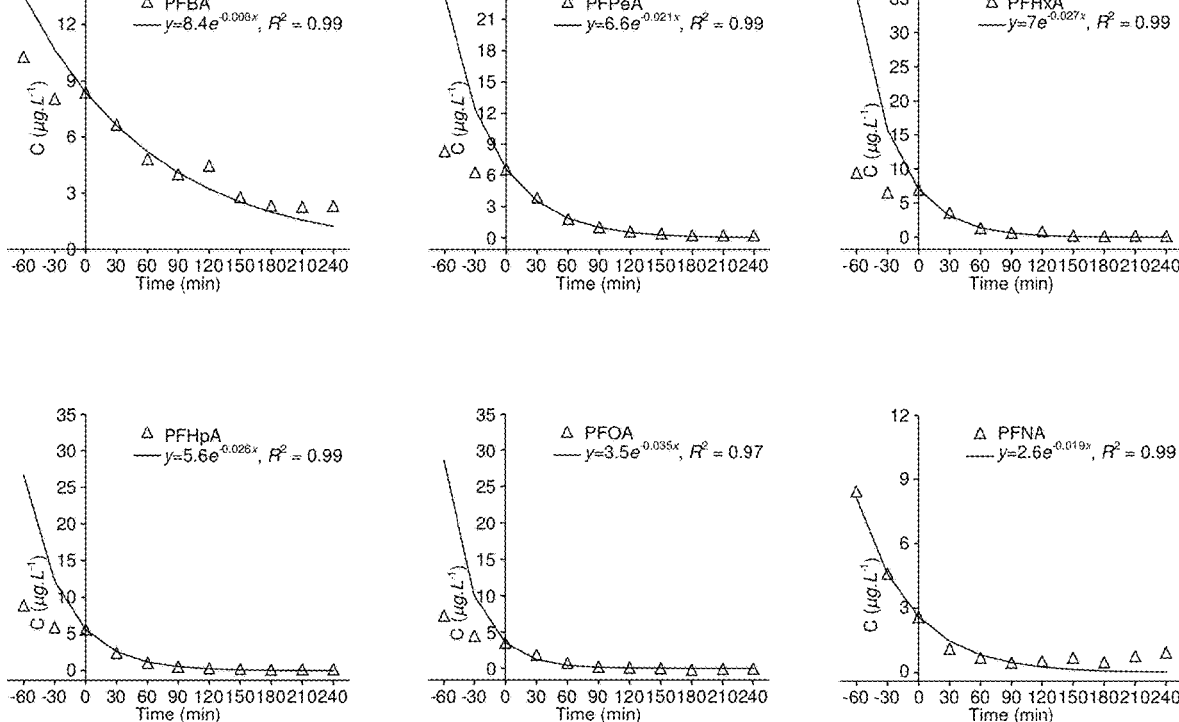
FIGS. 7A and 7B are graphs showing the observed first-order kinetics of 24 different PFASs in 10.2 g/L total dissolved solids (high TDS) groundwater, spiked with 24 mix of PFASs for closed system operation conditions
Figure 7A:
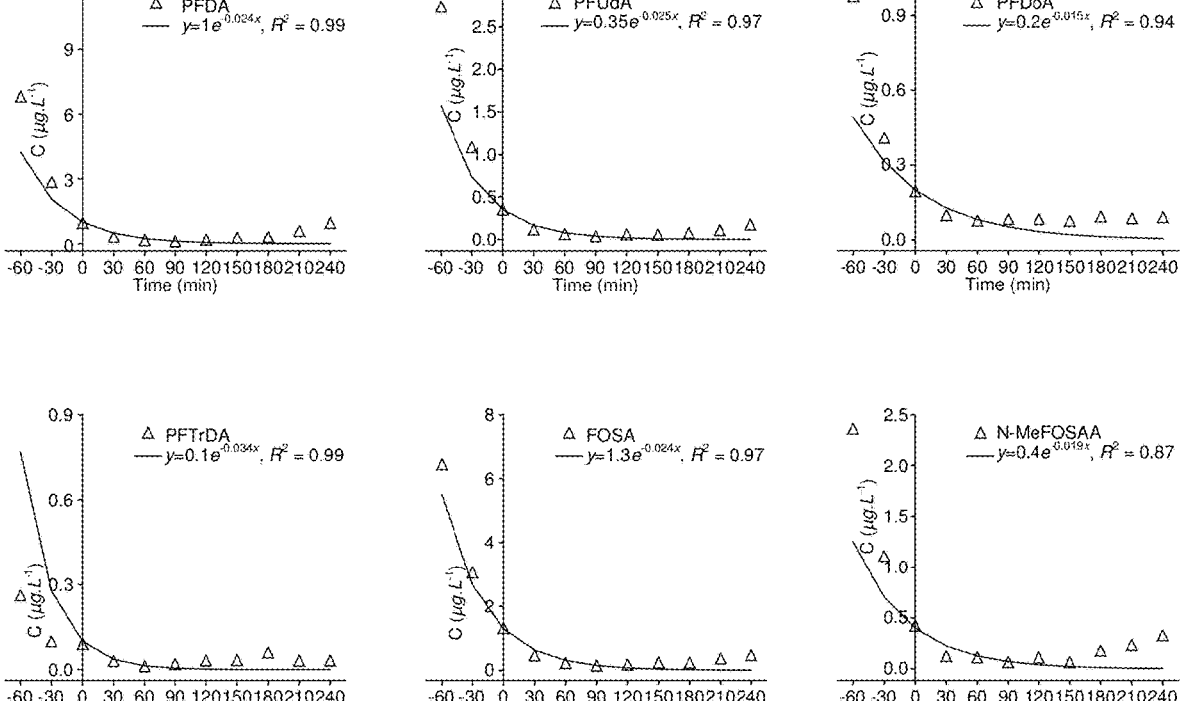
Figure 7B:
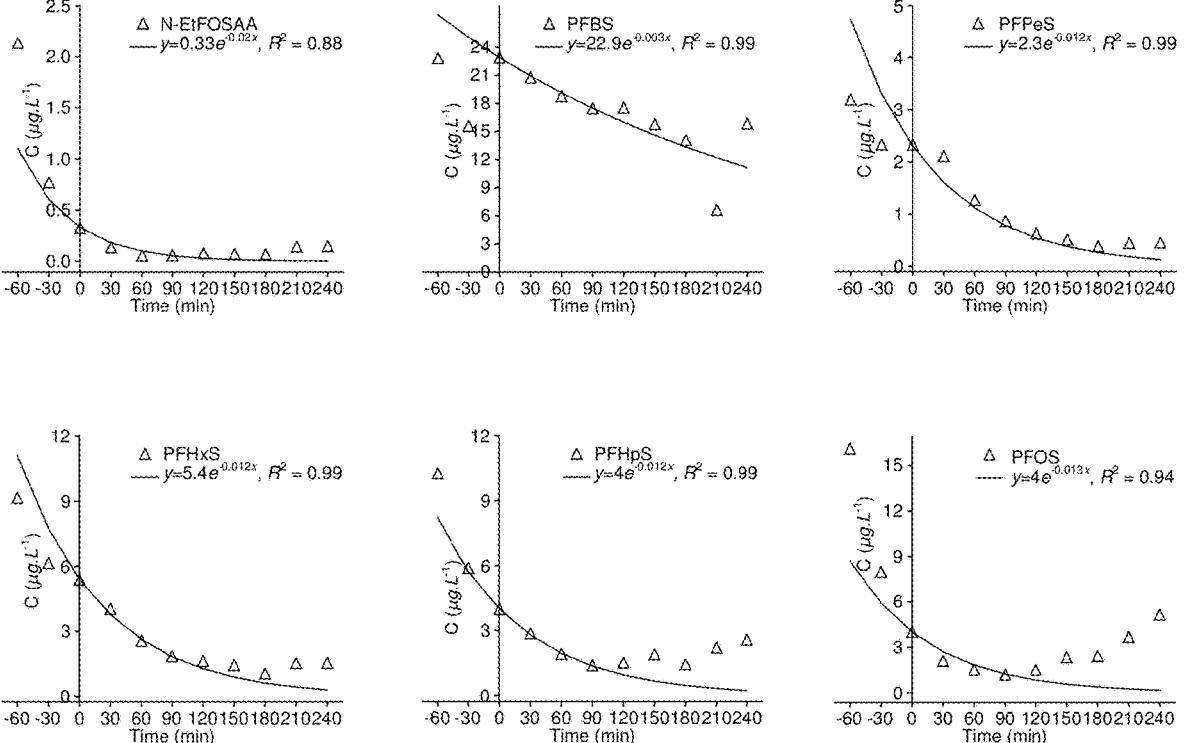
Figure 7B:
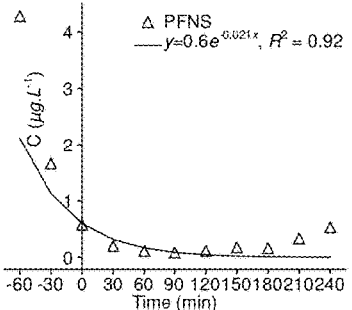
Figure 7B:
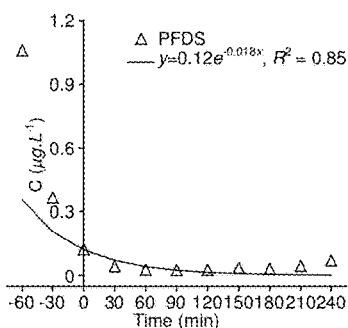
Figure 7B:
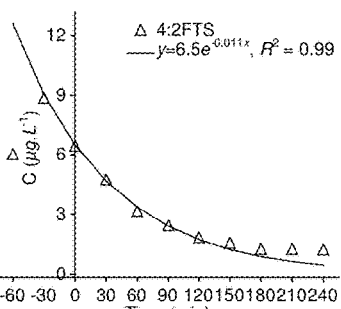
Figure 7B:
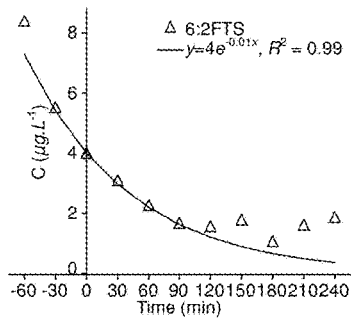
Figure 7B:
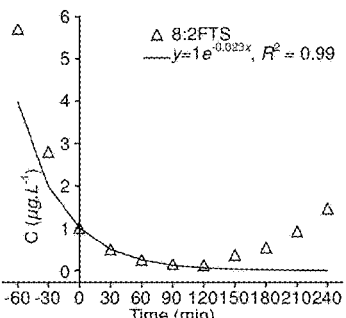
Figure 7C:
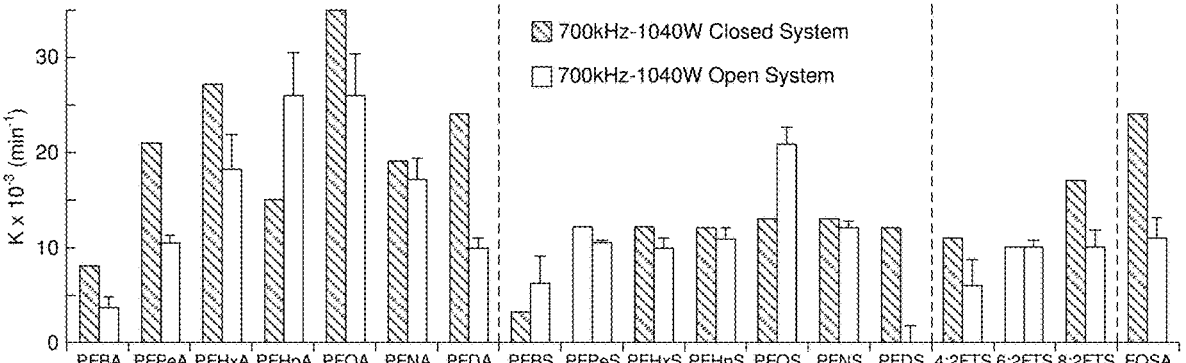
FIG. 7C is a graph showing a comparison of removal rates of 18 different PFASs of the 24 PFASs of FIGS. 7A and 7B.

Example 3—Comparison of Destruction Rates of 24 PFASs in Groundwater Containing High Total Dissolved Solids (TDS) in Different Operation Conditions The reaction rates for destruction of each of 24 mixed PFASs from a high TDS (10.2 g/L) groundwater sample were measured and compared. FIGS. 7A and 7B depict the degradation of 23 of the 24 PFASs for 240 minutes using the reactor and FIG. 7C depicts the observed rate constants for 18 different compounds of the 24 PFASs for the first 120 minutes using the initial rate method. The degradation rates of PFAS were recorded for 240 minutes under different operation configurations: in a 700 kHz-250 W open system in which gas (e.g., Argon) was allowed to escape and in a 700 kHz-1040 Watt completely closed system. The volume of the solutions were controlled so that the open system had a power density of 1250 W/L and the closed system had a power density of 1040 W/L. Referring now to FIG. 7C, the first bar illustrates the reaction rate of the PFAS for a 700 kHz single frequency operation at power density of 1040 W/L in closed system conditions. The second bar illustrates the reaction rate of the PFASs for a 700 kHz operation at a power density of 1250 W/L in open system conditions. As shown in FIG. 7C, the removal rates were higher in a closed system operation despite the lower power density as compared to the open system.

Example 4—Pseudo-First-Order Removal of PFASs

Figure 8:
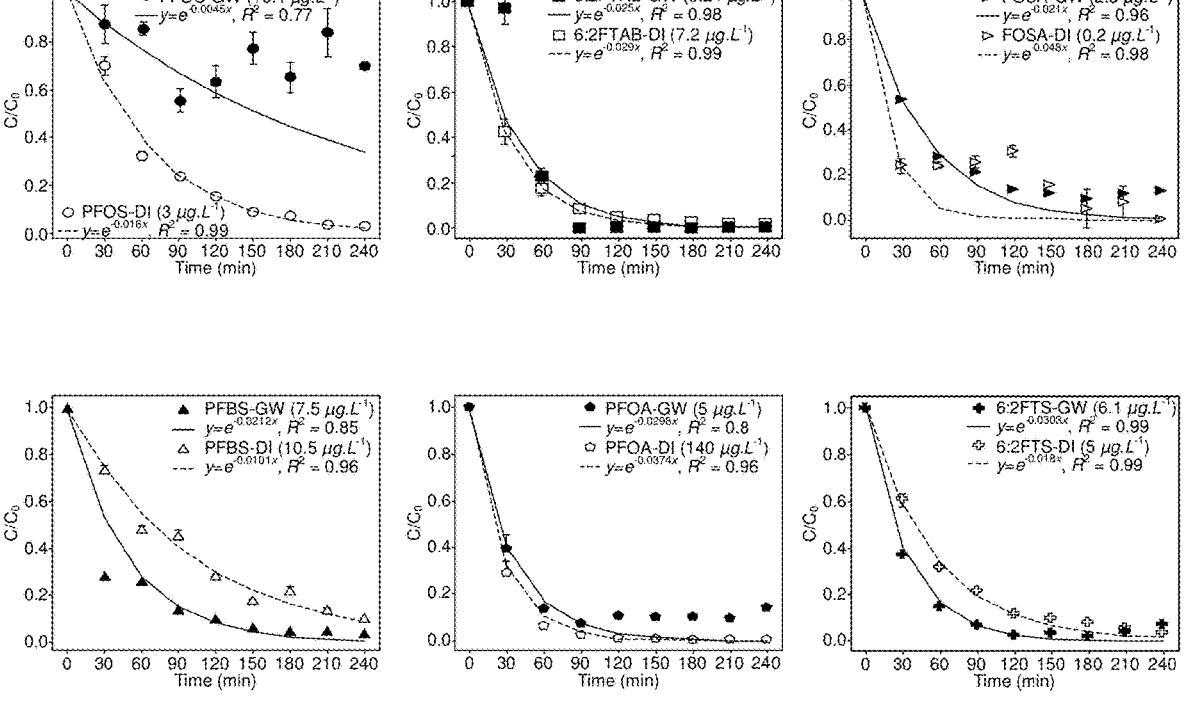
FIG. 8 is a graph showing observed first-order kinetics for the treatment of six different PFASs using a 700 kHz frequency operation in 388 mg/L (low) TDS groundwater matrix and deionized water.

Degradation of six PFASs were tested in deionized water (DI) and low TDS groundwater (GW) using the 700 kHz frequency operation at 1250 W/L power density at 10° C. in argon saturated environment. FIG. 8 depicts the degradation of PFASs for 240 minutes using the reactor. The starting concentrations are shown in parenthesis and the error bars represent analytical triplicates. The first-order model fitting is presented by the solid black line for low TDS groundwater (solid markers) and the dotted brown line for deionized water (empty markers) and the rates were calculated using the initial rate method. The removal rates were found to be independent of initial concentration within the tested range.

Example 5—Pseudo-First-Order Removal of PFASs in Concentrated Investigation Derived Waste (IDW)

Figure 9A:
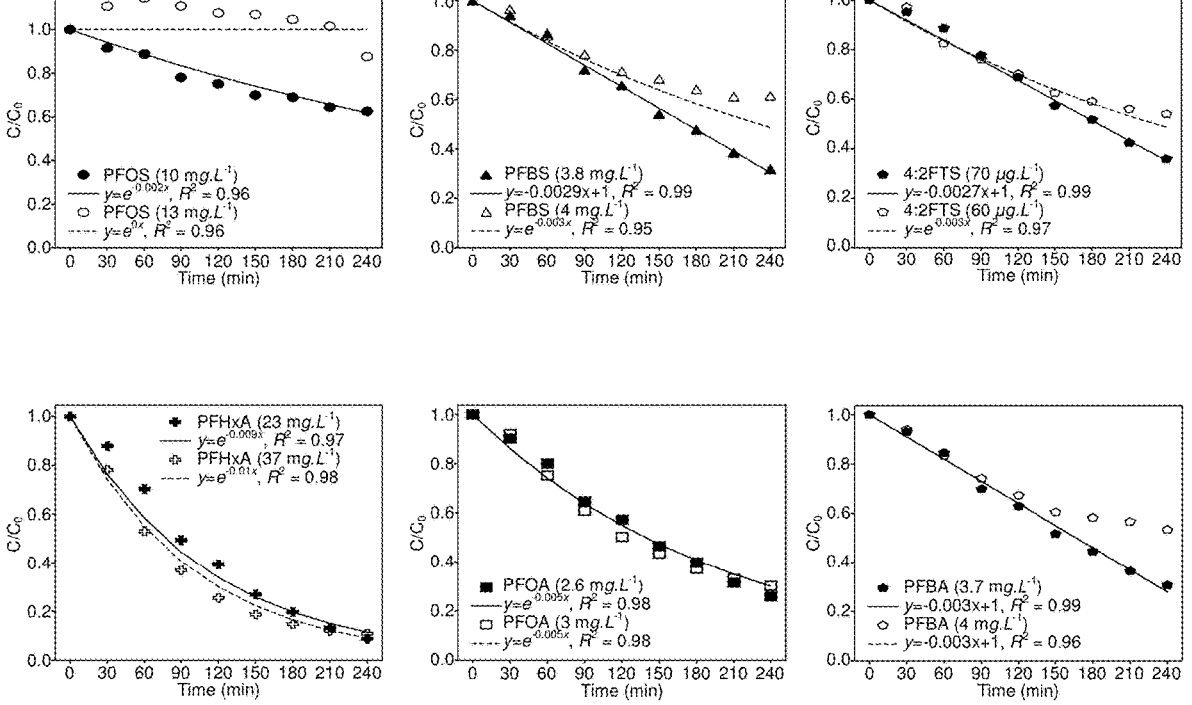
FIG. 9A depicts graphs showing observed decrease in the relative concentration (C/C_o) of 16 different PFASs for the treatment concentrated investigation derived waste (IDW) using a 700 KHz frequency operation of the reactor under two different system conditions.
Figure 9A:
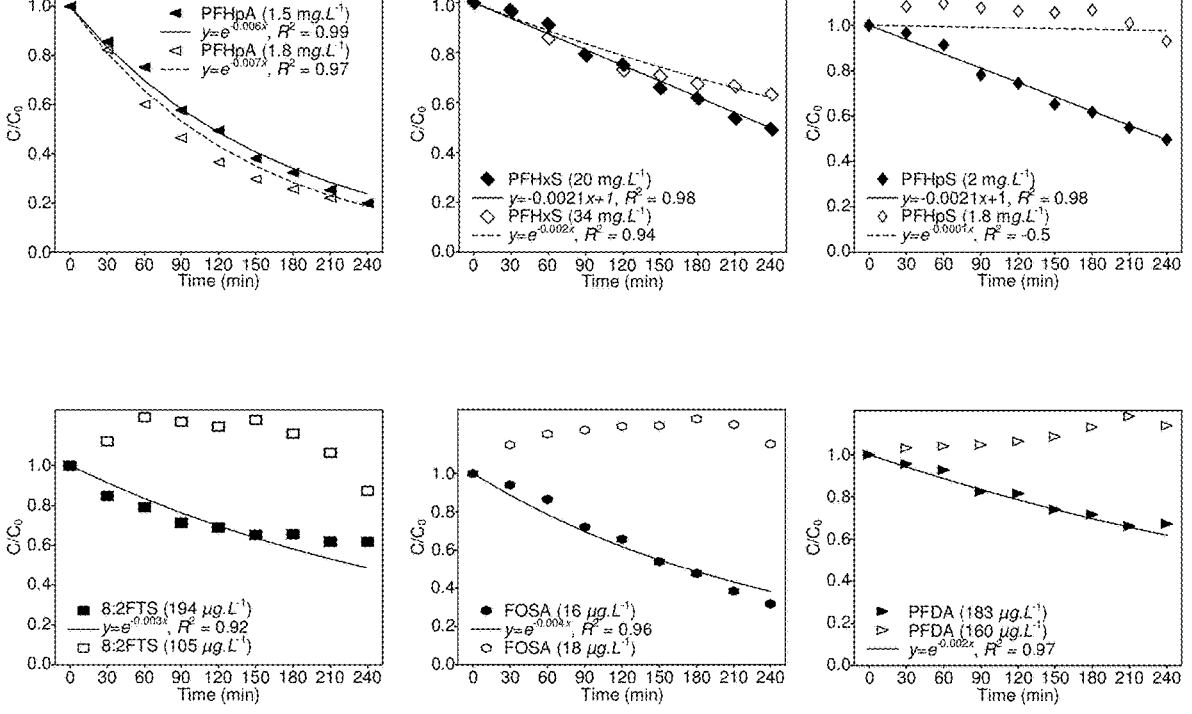
Figure 9A:
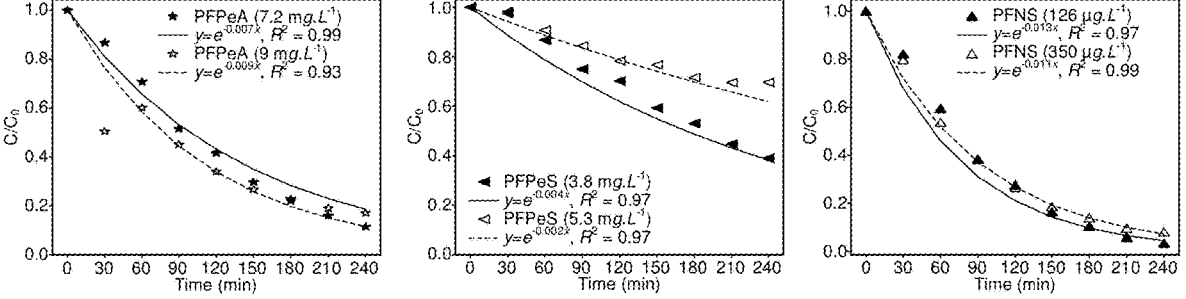
Figure 9A:
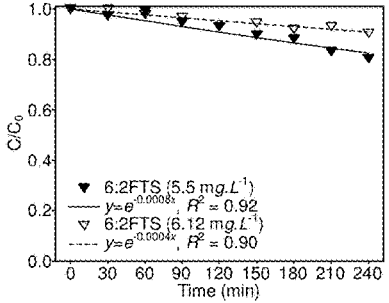
Figure 9B:
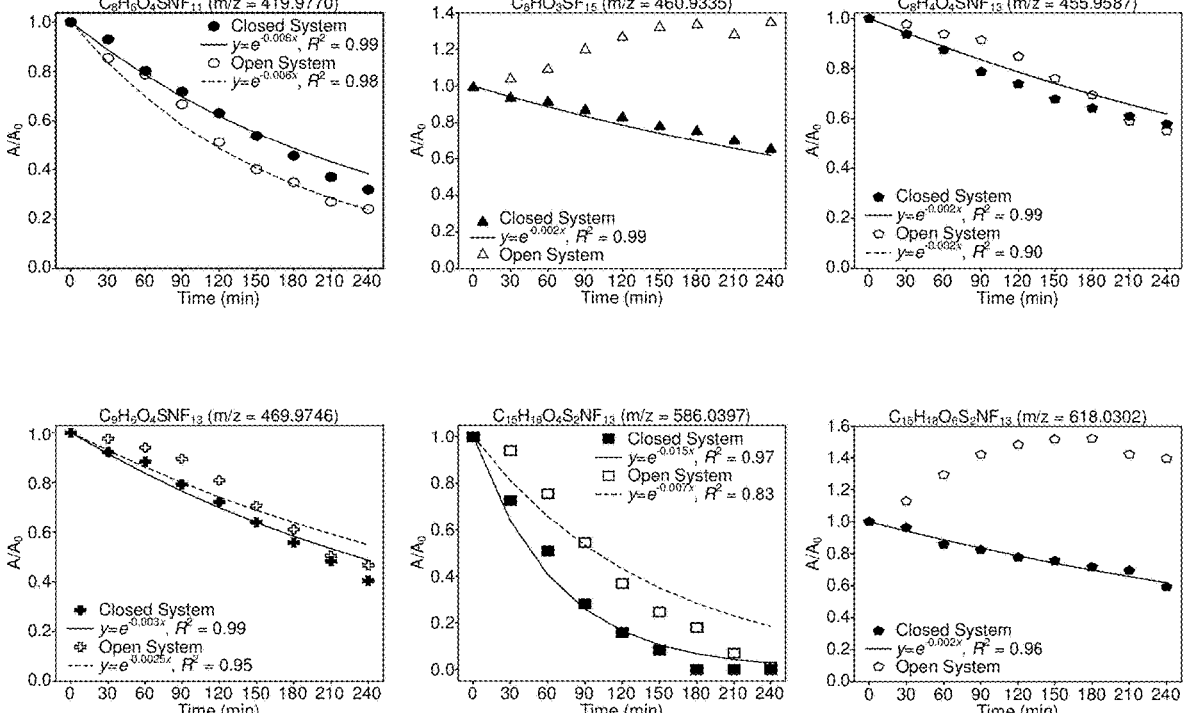
FIG. 9B depicts graphs showing observed decrease in relative chromatographic area (A/A_o) of 11 different PFASs detected in the negative electrospray ionization mode.
Figure 9B:
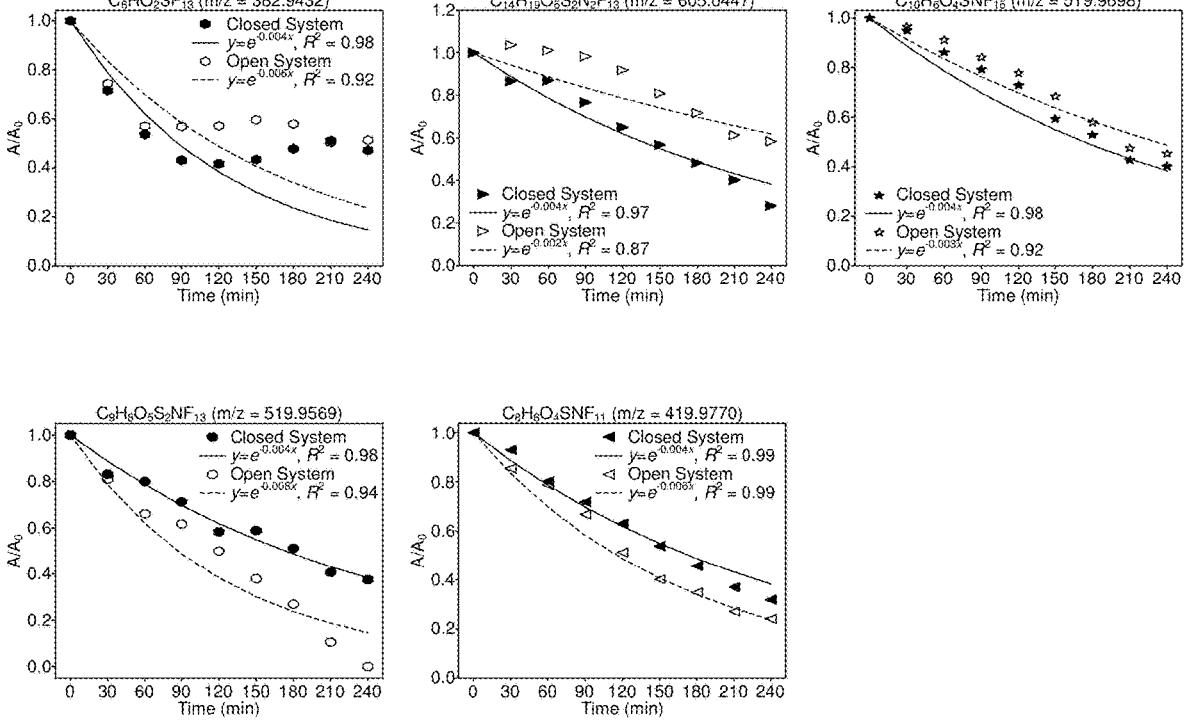
Figure 9C:
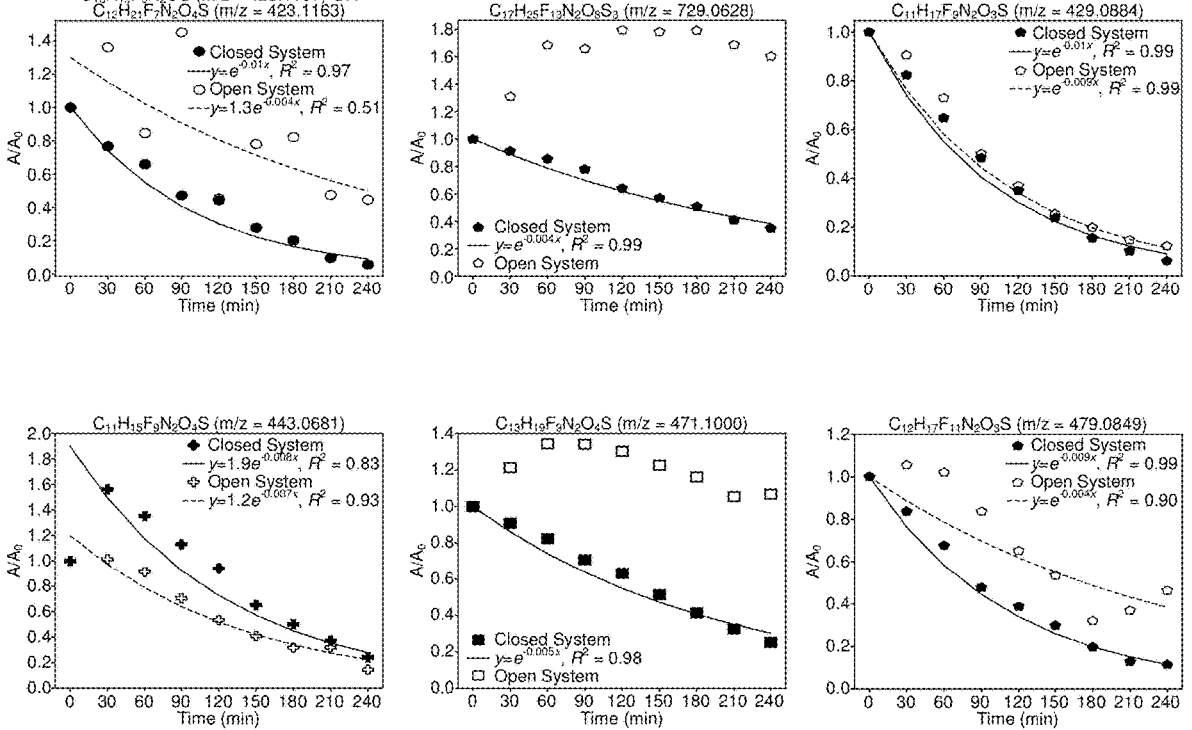
FIG. 9C depicts graphs showing observed decrease in relative chromatographic area (A/A_o) of 14 different PFASs detected in the positive electrospray ionization mode for the for the treatment concentrated investigation derived waste (IDW) using a 700 KHz frequency operation of the reactor under two different system conditions.
Figure 9C:
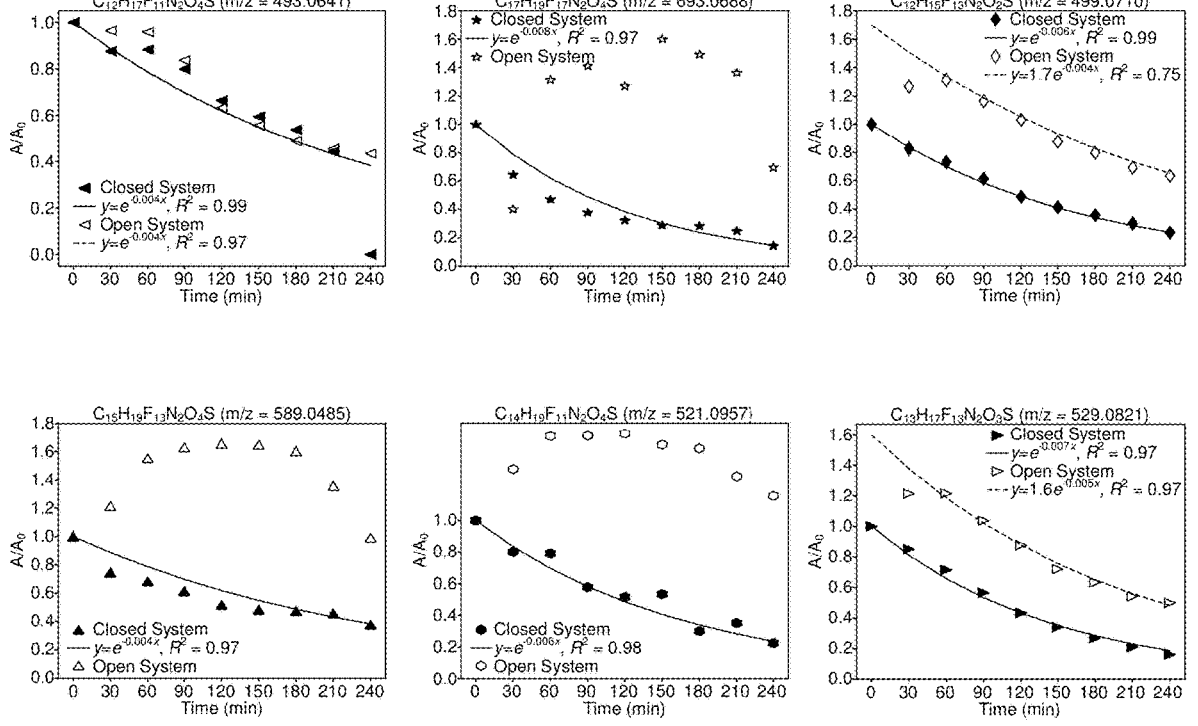
Figure 9C:
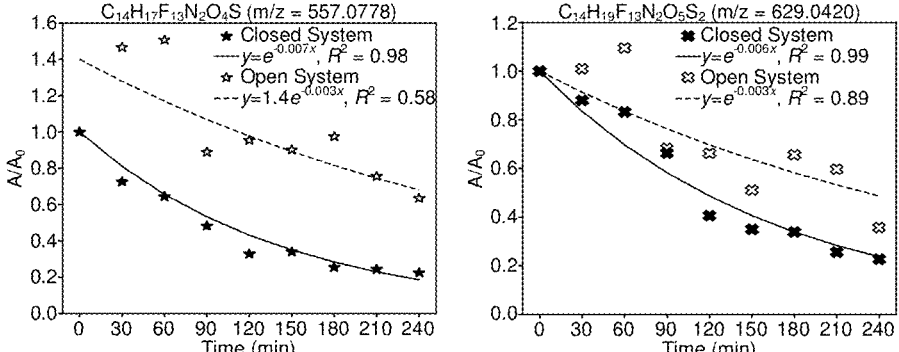
Figure 9D:
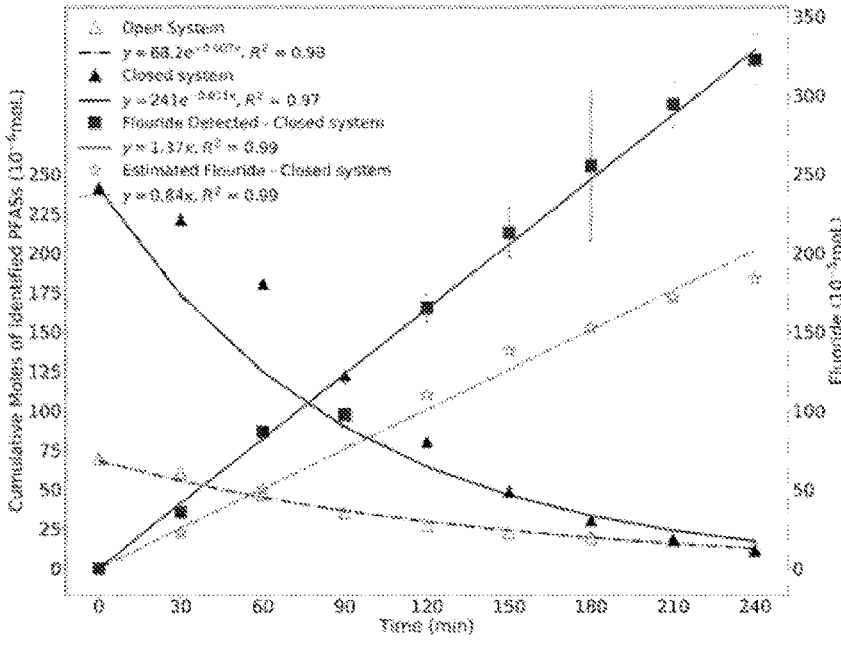
FIGS. 9D and 9E depict graphs showing observed defluorination, cumulative mass removal, and production of chlorate and per-chlorate for the degradation of 41 different PFASs during the treatment concentrated investigation derived waste (IDW) using a 700 KHz frequency operation of the reactor under two different system conditions.
Figure 9E:
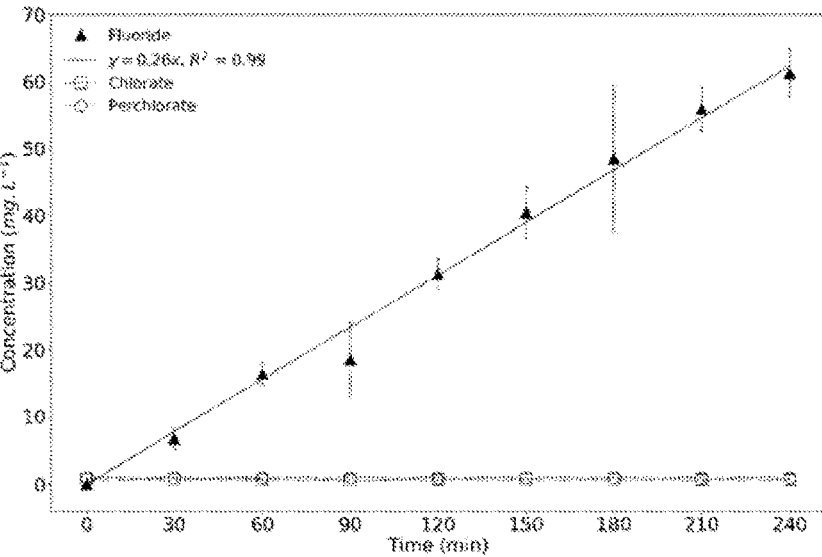

FIGS. 9A-9E shows results from studies of the removal rates for the 41 PFAS for the treatment of investigation derived waste (IDW) under two different operational configurations: an open system operation having a power density of 1250 W/L at 700 kHz and closed system operation having a power density of 1040 W/L at 700 kHz. The acoustic degradation rates and mass removal PFASs were higher in closed system ($P_d$=1040 W/L) as compared to open system ($P_d$=1250 W/L) despite the lower power density. FIG. 9A depicts the decrease in concentration 16 PFAS for 240 minutes using the reactor. FIG. 9B depicts the decrease in the relative chromatographic area ($A/A_o$) for PFASs detected in the negative electrospray ionization mode for 240 minutes using the reactor. FIG. 9C depicts the decrease in the relative chromatographic area ($A/A_o$) for PFASs detected in the positive electrospray ionization mode for 240 minutes using the reactor. FIG. 9D depicts the defluorination of IDW in closed system and the cumulative moles of PFASs removed during 240 minutes of reactor operation for IDW treated in a closed system compared to IDW treated in the open system. FIG. 9E depicts concentrations in parts per million (ppm) of fluoride, chlorate, and perchlorate detected during sonication of IDW in closed system. The error bars represent standard deviation of analytical duplicates.

Example 6—Pseudo-First-Order Removal of PFASs in Deionized Water Amended with Aqueous Film Forming Foam (AFFF)

Figure 10A:
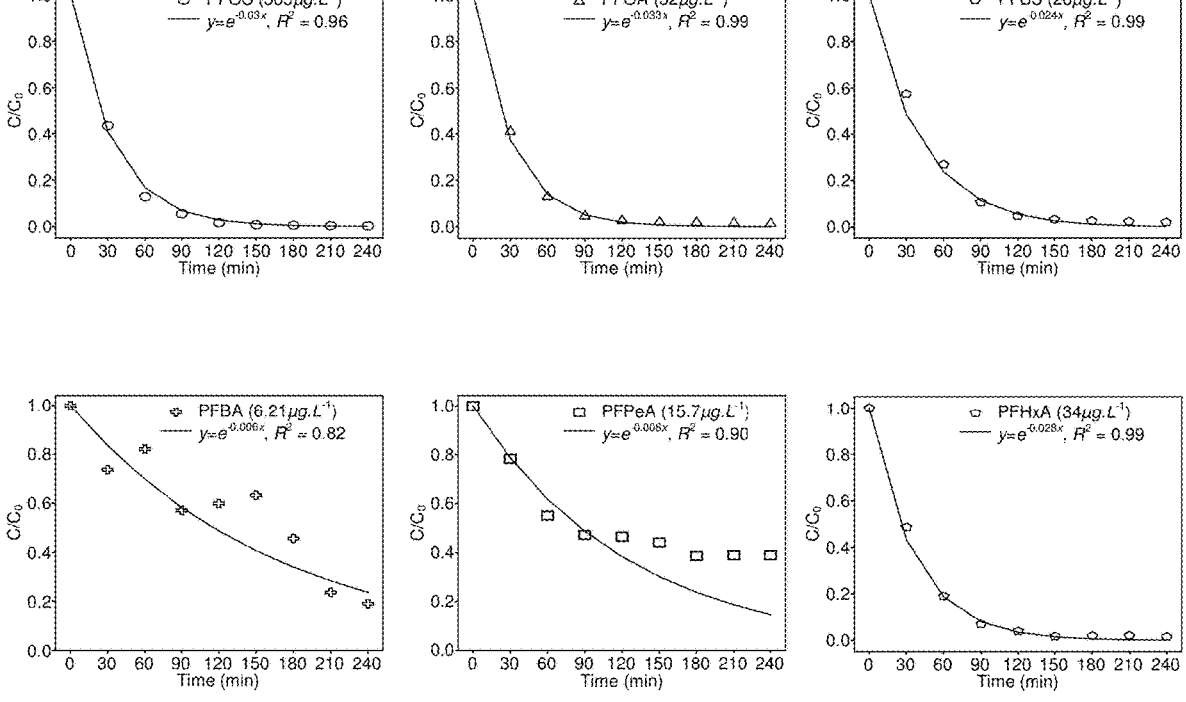
FIG. 10A depicts graphs showing observed decrease in the relative concentration (C/C_o) of 10 different PFASs for the treatment of deionized water spiked with aqueous film forming foam (AFFF) using a 700 KHz frequency operation.
Figure 10A:
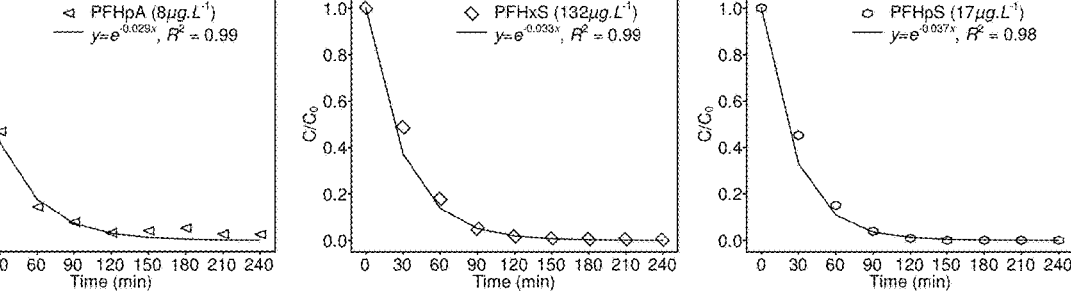
Figure 10A:
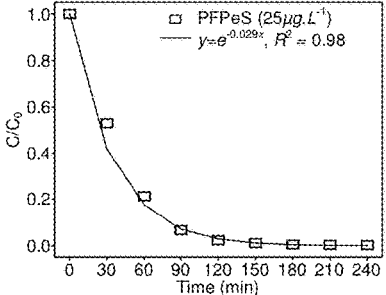
Figure 10B:
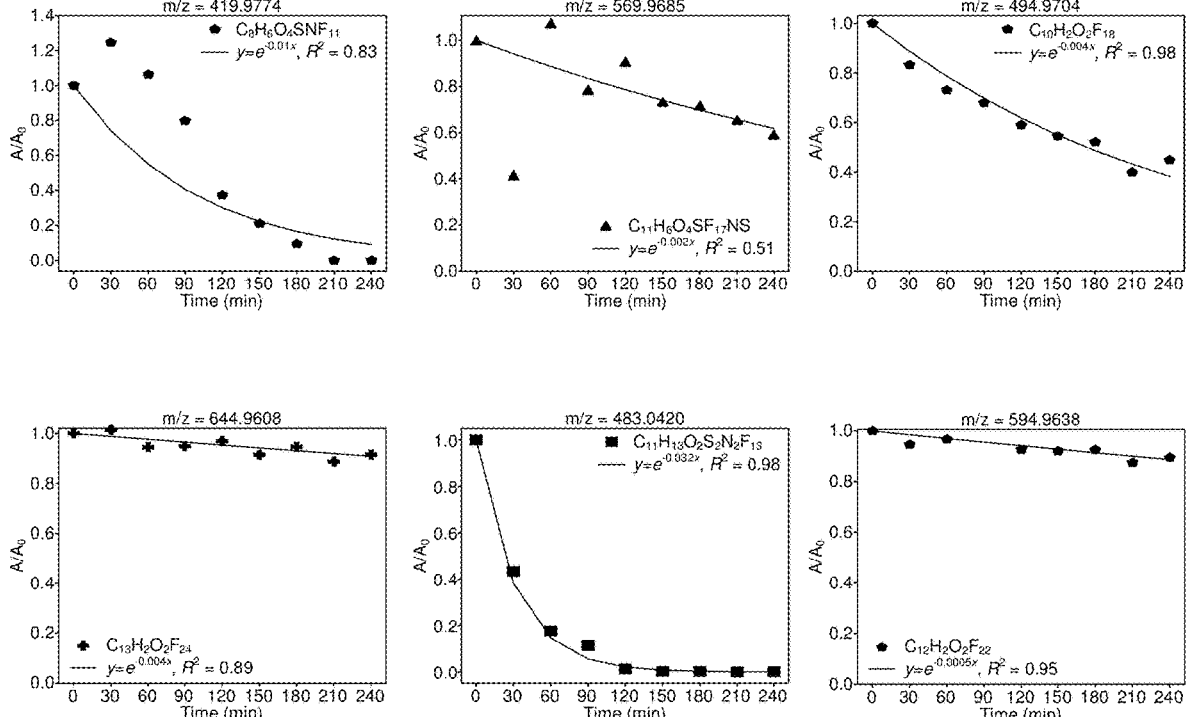
FIG. 10B depicts graphs showing observed decrease in relative chromatographic area (A/A_o) of 12 different PFASs detected in the negative electrospray ionization mode
Figure 10B:
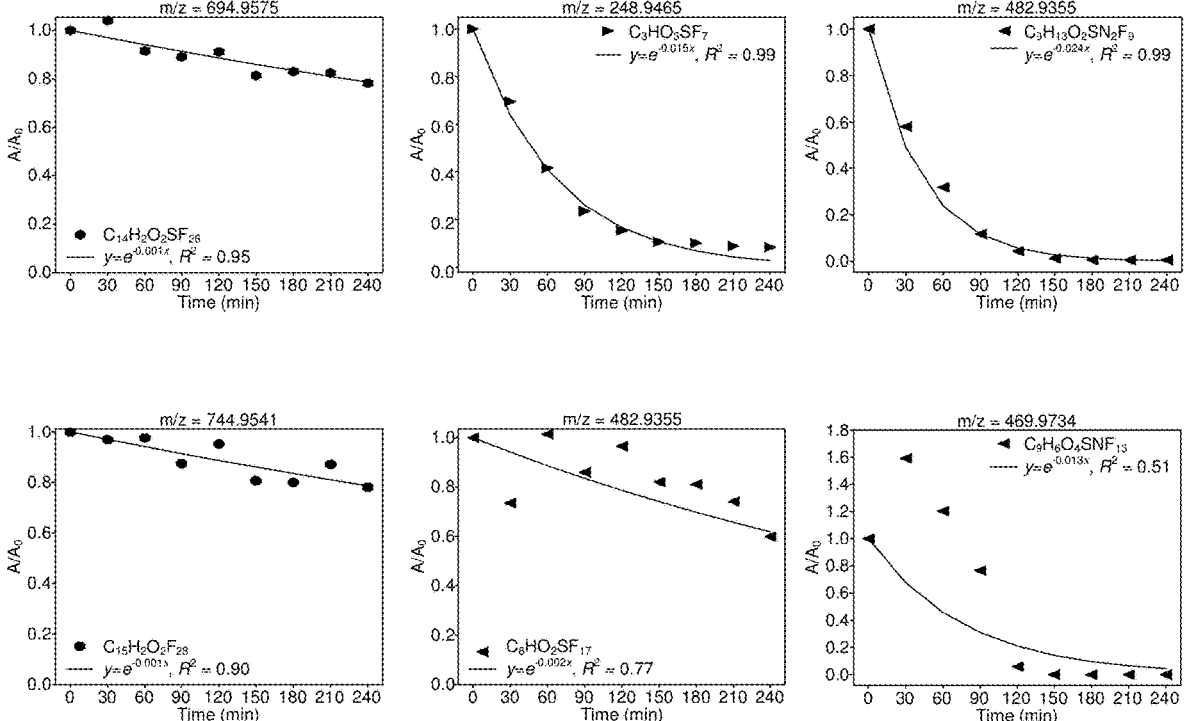
Figure 10C:
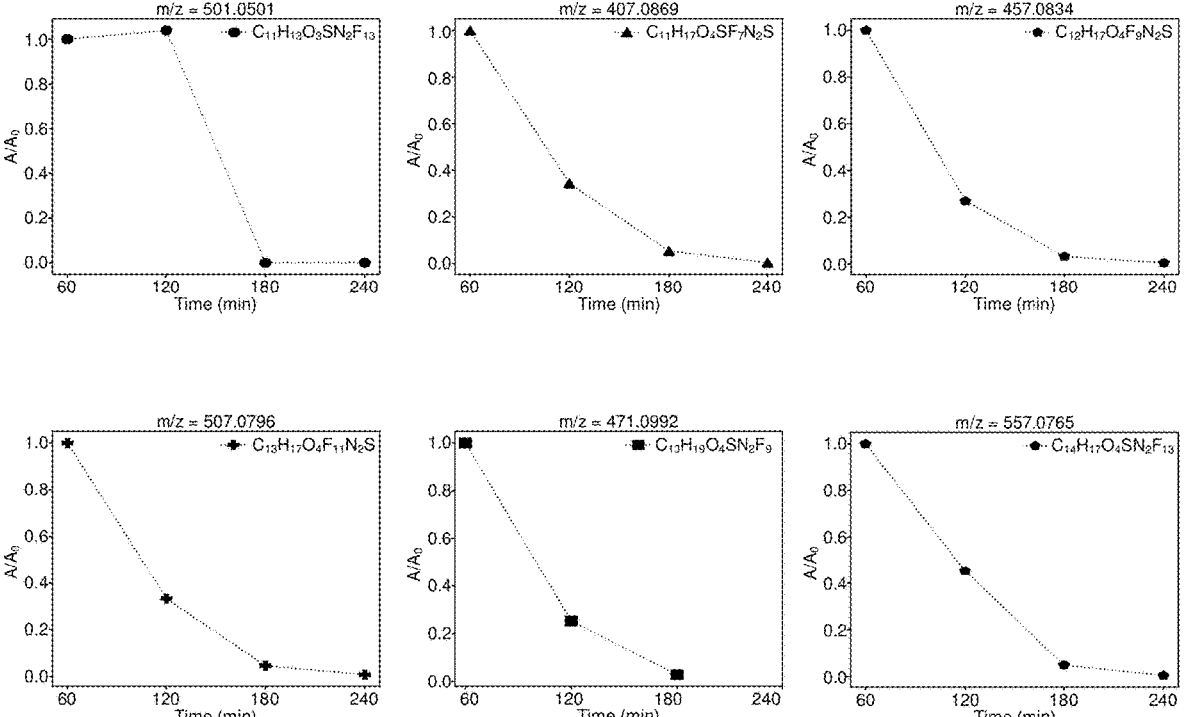
FIG. 10C depicts graphs showing observed decrease in relative chromatographic area (A/A_o) of 11 different PFASs detected in the positive electrospray ionization mode for the treatment of deionized water spiked with AFFF using a 700 KHz frequency operation.
Figure 10C:
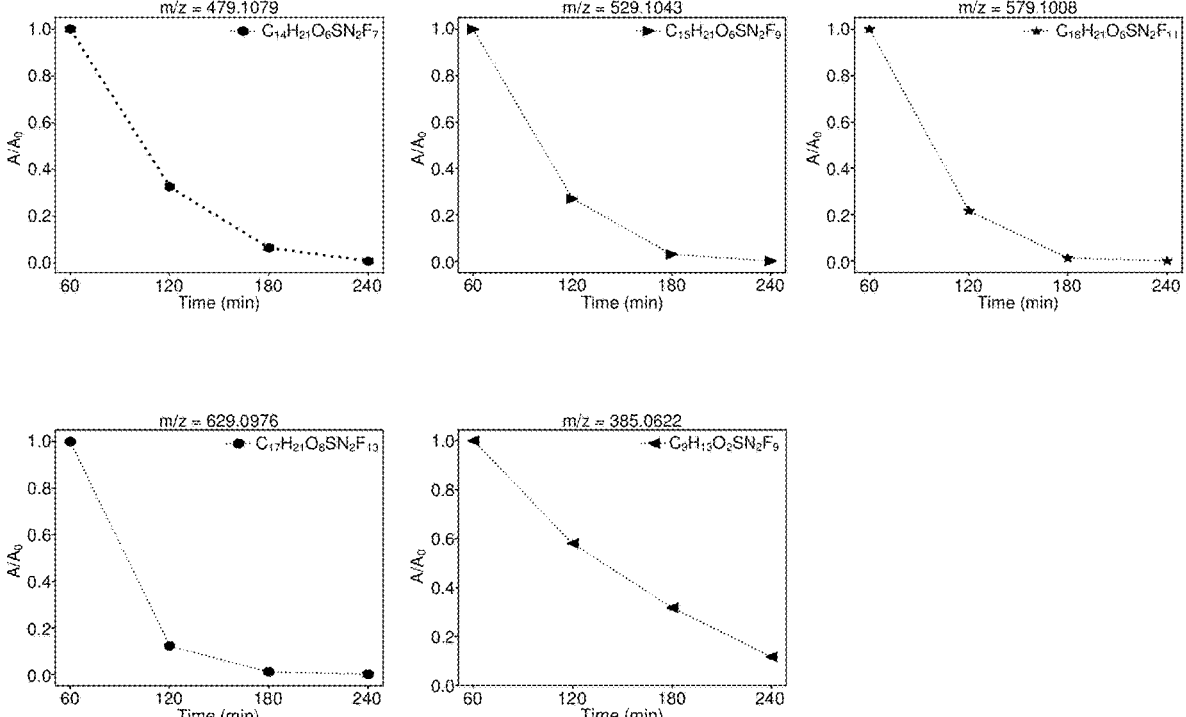
Figure 10D:
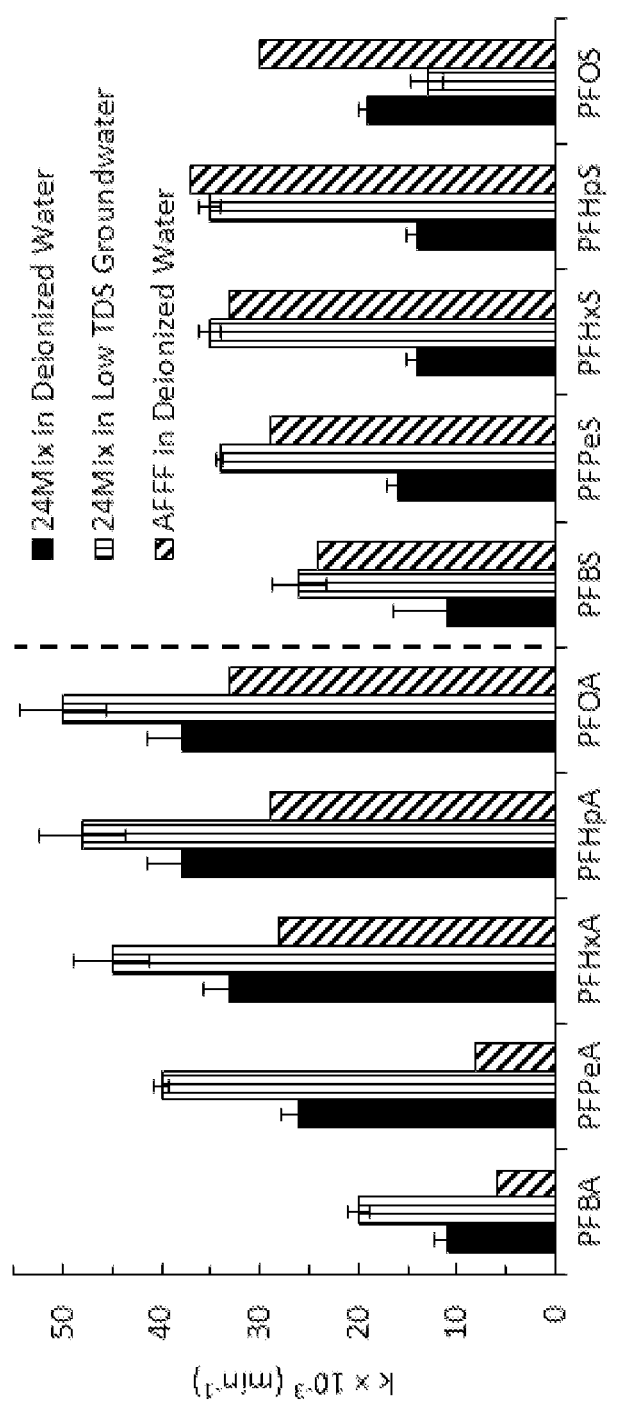
FIG. 10D is a graph showing the comparison of pseudo-first-order removal rates of PFASs in AFFF spiked deionized water, 24Mix-spiked deionized water, and 24Mix-spiked low TDS groundwater at 700 kHz.

FIGS. 10A-10D show results from studies of the removal rates for the 33 PFAS for the treatment of AFFF impacted deionized water for the operational configurations of the 700 kHz-250 W open system operation (1250 W/L) at 10° C. in Argon saturated environment. FIG. 10A depicts the decrease in concentration 10 PFAS for 240 minutes using the reactor. FIG. 10B depicts the decrease in the relative chromatographic area ($A/A_o$) for PFASs detected in the negative electrospray ionization mode for 240 minutes using the reactor. FIG. 10C depicts the decrease in the relative chromatographic area ($A/A_o$) for PFASs detected in the positive electrospray ionization mode for 240 minutes using the reactor. FIG. 10D depicts the comparison of pseudo-first-order removal rates (k) of PFASs in AFFF spiked deionized water, 24Mix-spiked deionized water, and 24Mix-spiked low TDS groundwater calculated for the first 120 min using the initial rate method. The rates of removal for sulfonates in AFFF were significantly higher than those observed for a 24 mix of PFASs; vice versa is true for carboxylates. The highest rates of short-chain PFAS degradation were observed for the treatment of 24Mix in the low TDS groundwater.

Figure 11:
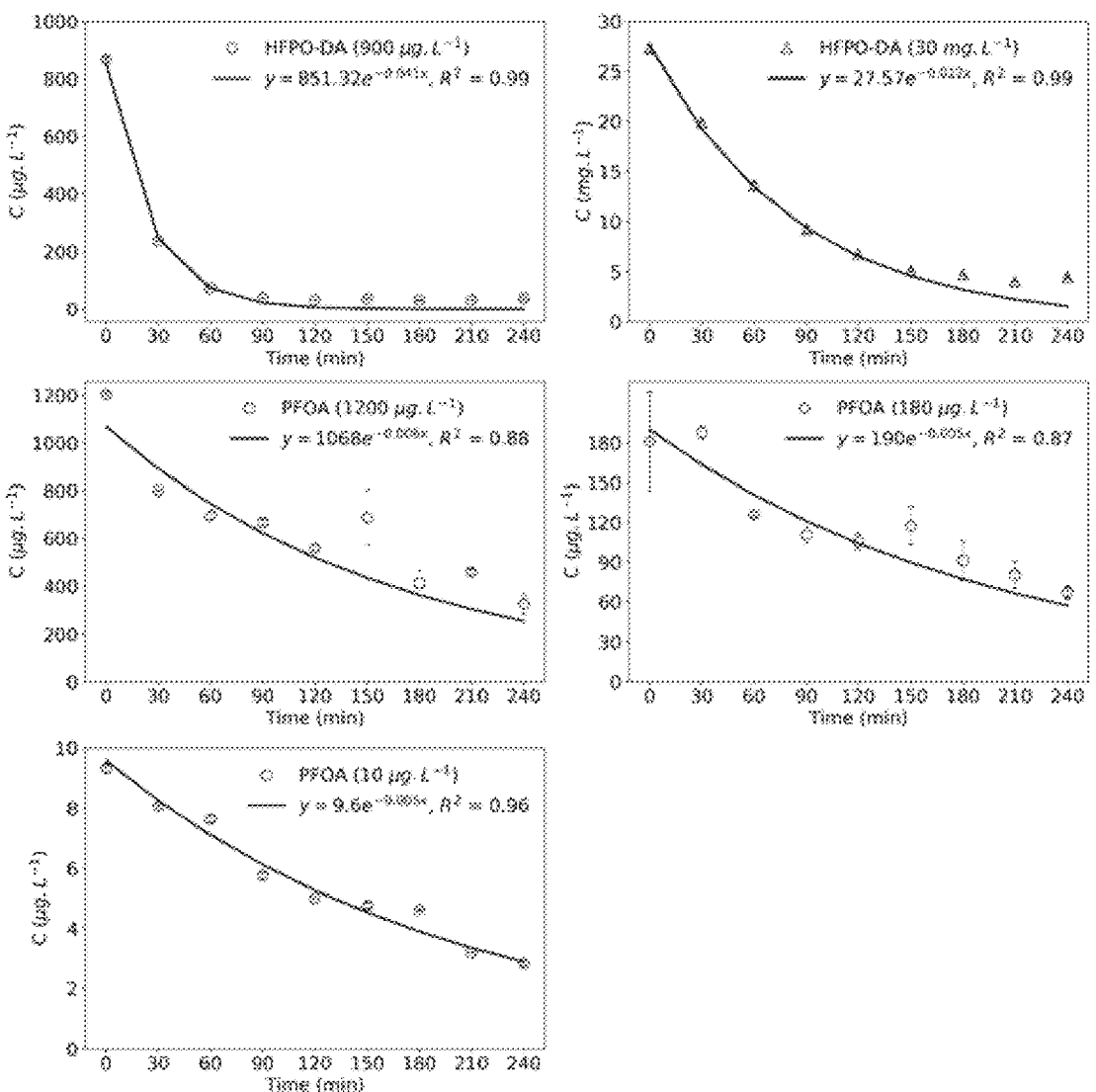
FIG. 11 depicts graphs showing the observed first-order kinetics of PFOA and HFPO-DA (GenX) at different starting concentrations in independent experiments.

Example 7—Effect of Initial Concentration on the Kinetics of PFASs Degradation HFPO-DA and PFOA impacted water was treated in a 700 kHz-250 W open system configuration n argon saturated environment. The HFPA-DA was processed at a power density of 1250 W·L$^{-1}$ and the PFOA was treated at a power density of 250 W·L$^{-1}$ (at 10° C. reactor temperature). PFAS removal rates were found to be independent of initial concentration at lower concentration (low ppm). For example, referring to FIG. 11, the PFOA removal rates for 1600, 200, and 10 ppb concentrations, show the concentration has only a nominal effect on the rate of removal. PFAS removal kinetics become representative of zero order kinetics instead of pseudo-first-order kinetics at high initial concentrations (high ppm). As shown in FIG. 11, the HFPO-DA removal rates for water amended with 900 ppb, show pseudo-first-order kinetics while the HFPO-DA removal rates for water amended with 30 ppm is closer to zero order kinetics.

Example 8—Defluorination of HFPO-DA (GenX) and 6:2FTAB

Figure 12A:
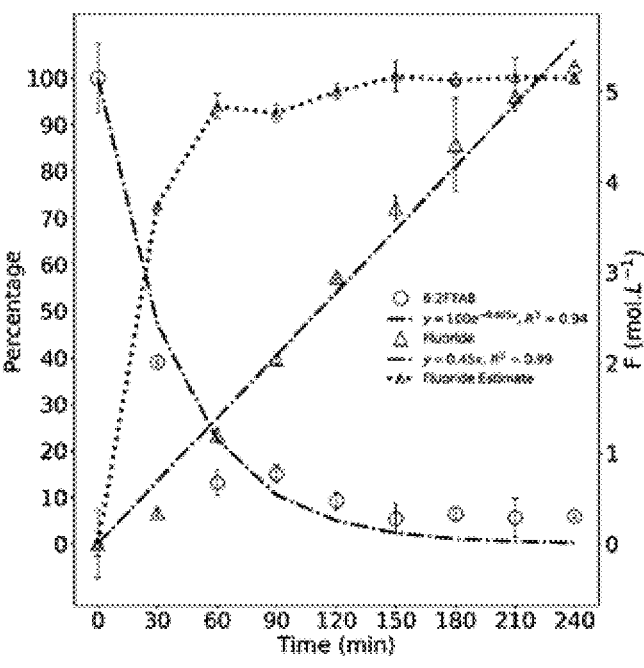
FIGS. 12A and 12B are graphs showing the observed first-order kinetics and defluorination of 6:2FTAB and HFPO-DA (GenX) in deionized water during operation conditions at a 700 KHz frequency.
Figure 12B:
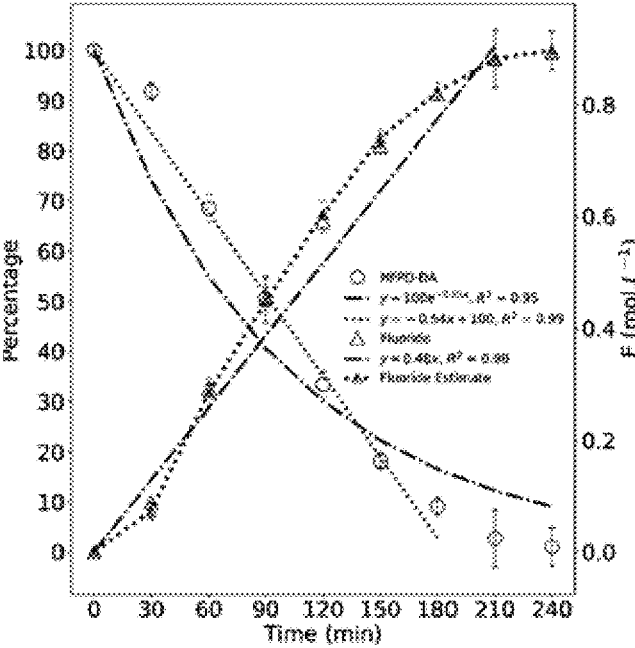

Deionized water spiked with HFPO-DA (GenX) and: 2FTAB were processed using a 700 kHz-1040 W closed system (P$_d$=1040 W/L) for 240 minutes in Argon saturated atmosphere at 10° C. The GenX solution had a starting concentration of 23 ppm (23 mg/L) and the 6:2FTAB solution had a starting concentration of 23 ppm (4 mg/L). Removal rates were calculated for the first 120 min based on the initial rate method. As shown in FIGS. 12A and 12B, the reactor was able to defluorinate over 99% of GenX (degraded from 23 mg·L$^{-1}$ to 232 µg·L$^{-1}$) and 98% 6:2FTAB (degraded from 4 mg·L$^{-1}$ to 186 µg·L$^{-1}$) over the 240 minutes.

Methods for Operation for Studies Described in Examples 1-8

In each of the above cases, the reactor (e.g., 110, 210) included a cubical chamber (e.g., 112, 212). The reactor housing (e.g., 110, 210) was made of polypropylene and stainless steel and the reactor included a high-density polyethylene (HDPE)/stainless steel cooling coil (e.g., 120, 230) and an array of piezoelectric transducers (e.g., 120, 220) disposed on a stainless-steel plate coupled to a base (e.g., 114, 214) of the chamber.

A measured volume of PFAS impacted water was prepared in polypropylene bottles by spiking it with individual compounds or mixtures of PFAS. The PFAS-water solution was then added into the chamber, followed by 30 minutes of Argon sparging via a gas communication port (e.g., 218a) to allow for an argon saturated reaction environment. The flow of Argon was maintained at 5.7×10$^{-2}$ m$^3$·h$^{-1}$ during the experiment and was monitored using an inline flow meter. A 5 mL sample was collected every 30 min using a sterile 1 mL polypropylene syringe and stored in 15 mL polypropylene tubes at 4° C. until needed for analysis. The reactor was operated as either open system where the Argon gas in the headspace could escape, or as a closed system where the Argon, head space, and other reaction constituents were retained in the reactor under pressure.

Example 9—Pseudo-First-Order Removal of PFASs in Groundwater Impacted with Aqueous Film Forming Foam (AFFF)

Figure 13:
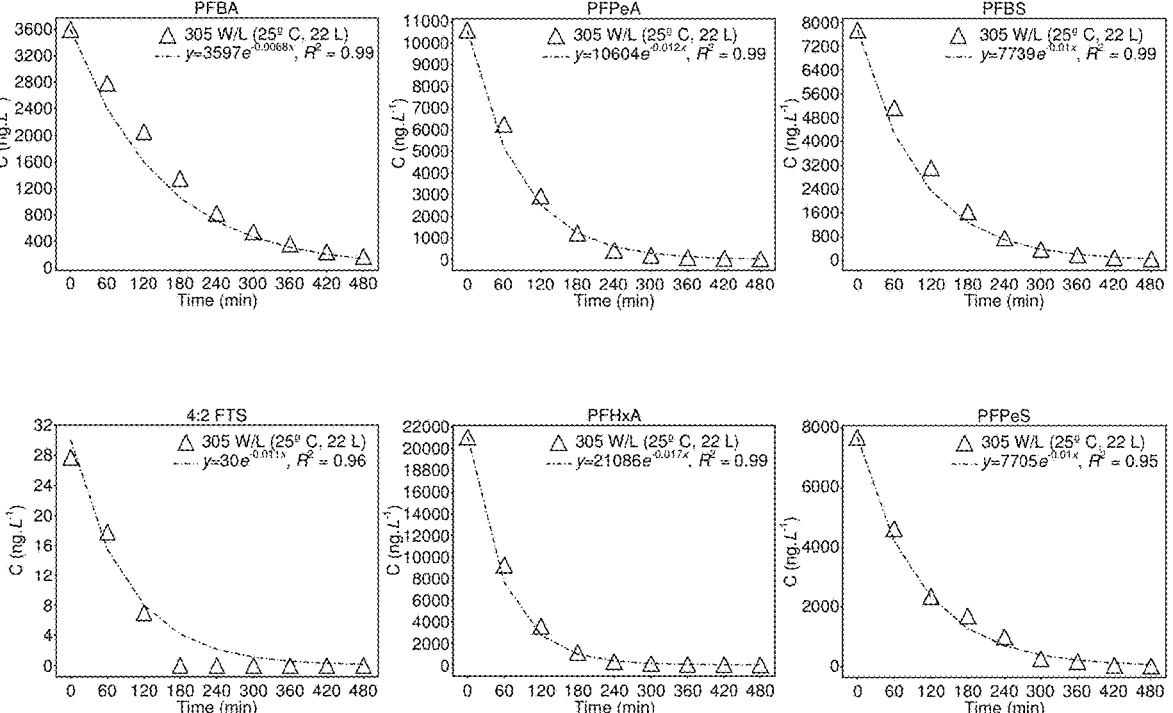
FIG. 13 depicts graphs showing the decrease in relative concentration (C/C_o) of 15 PFAS species and cumulative mass removal of 15 PFASs of AFFF-impacted groundwater during operation conditions at 700 KHz.
Figure 13:
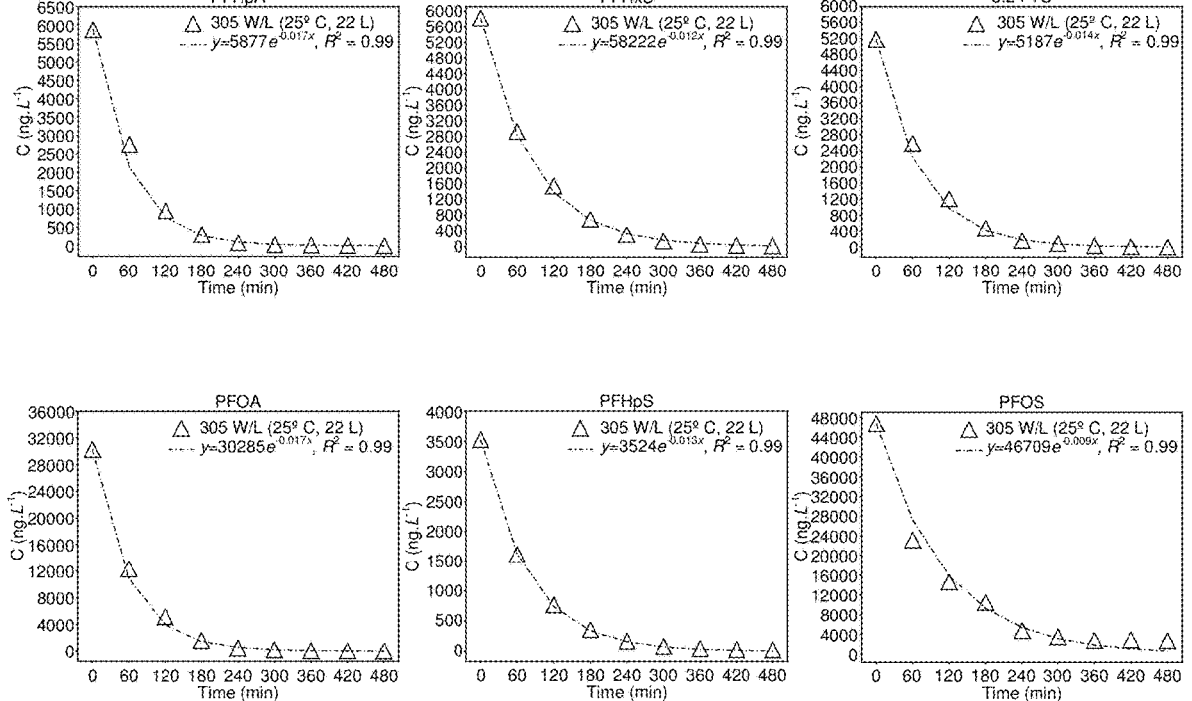
Figure 13:
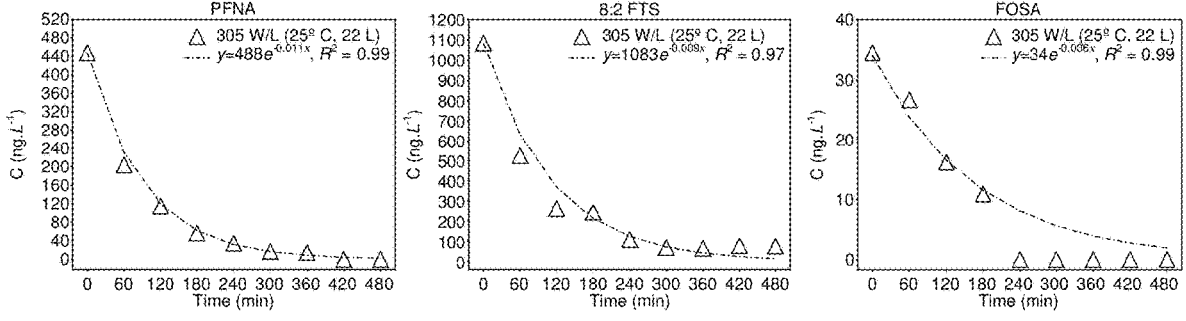
Figure 13:
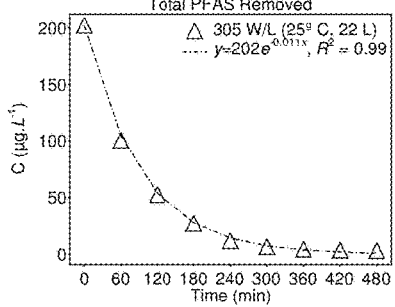

High (10.2 g/L) TDS groundwater that was impacted by AFFF was collected and tested. 15 PFASs were detected in the impacted groundwater. 22 Liters of the impacted groundwater was then treated using a 700 kHz-7200 W closed system for 480 minutes in Argon saturated environment. The treatment was performed at 305 W/L and 25° C. FIG. 13 shows the decrease in relative concentration (C/C$_o$) of the 15 PFAS species and cumulative mass removal of 15 PFASs during the treatment. The rates were calculated for the first 120 min using the initial rate method. The dotted lines represent the first-order kinetics model fitting for the experimental data.

Example 10—Pseudo-First-Order Removal of Total Oxidizable Precursors (TOPs) of PFASs in Groundwater Impacted with Aqueous Film Forming Foam (AFFF)

Figure 14:
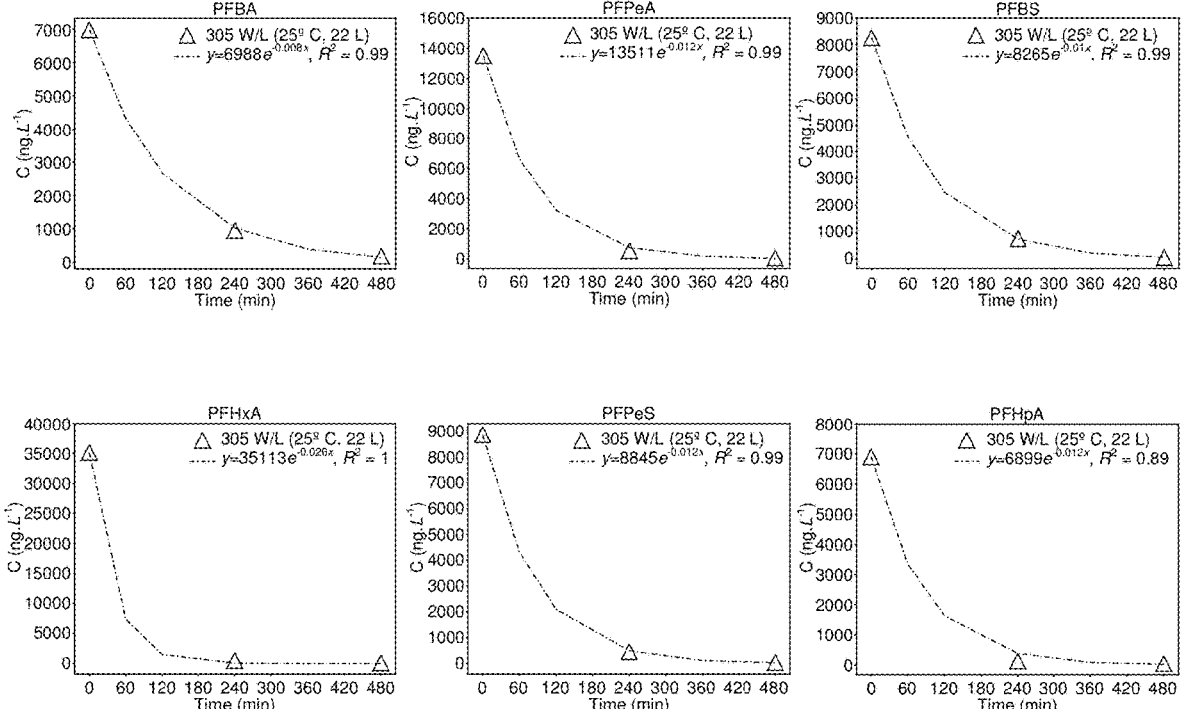
FIG. 14 depicts graphs showing the decrease in relative concentration (C/C_o) of Total Oxidizable Precursors (TOP) for 11 PFAS species and cumulative mass removal of 11 TOPs of AFFF-impacted groundwater during operation conditions at 700 KHz.
Figure 14:
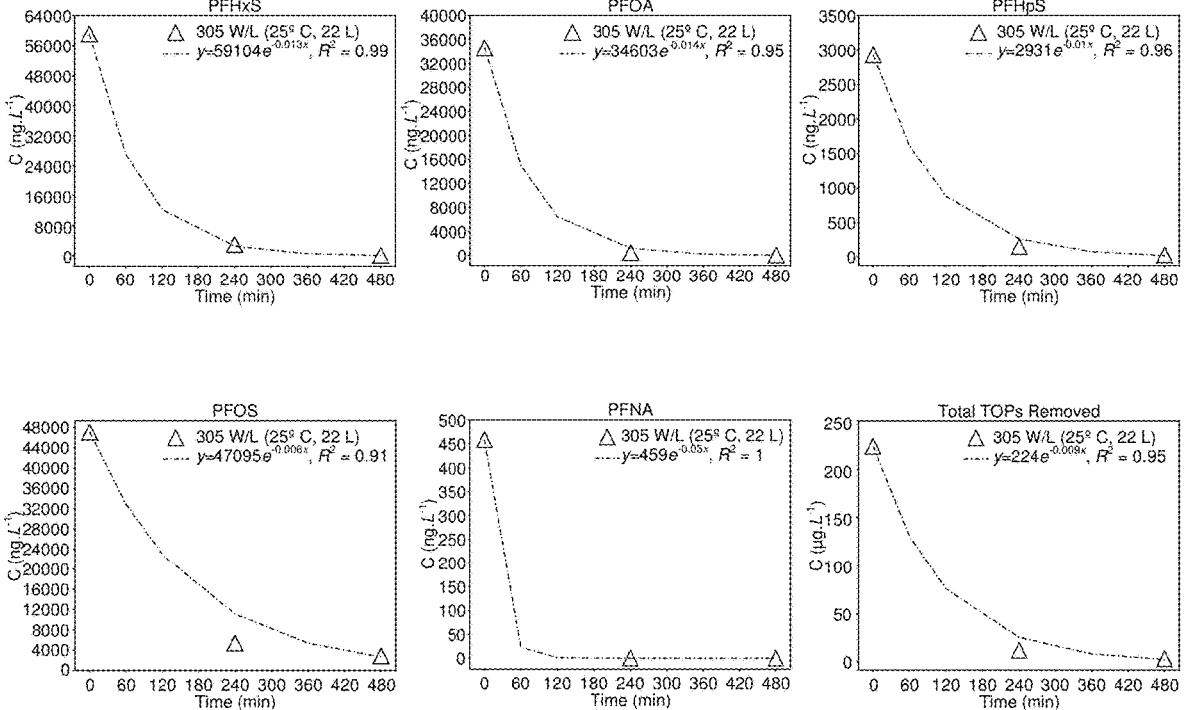

High (10.2 g/L) TDS groundwater that was impacted by AFFF was collected and tested. 11 PFAS TOPs (Total oxidizable precursors) were detected in the impacted groundwater. 22 liters of the impacted groundwater was treated using a 700 kHz-7200 W closed system for 480 minutes in Argon saturated environment. The treatment was performed at 305 W/L and 25° C. FIG. 14 shows the decrease in relative concentration (C/C$_o$) of Total Oxidizable Precursor (TOP) for the 11 PFAS species and cumulative mass removal of 11 TOPs for the treatment of the AFFF impacted groundwater. The rates were calculated for the first 120 min using the initial rate method. The dotted lines represent the first-order kinetics model fitting for the experimental data.

Example 11—Concentration of Anions During the Treatment of Groundwater Impacted with Aqueous Film Forming Foam (AFFF)

Figure 15:
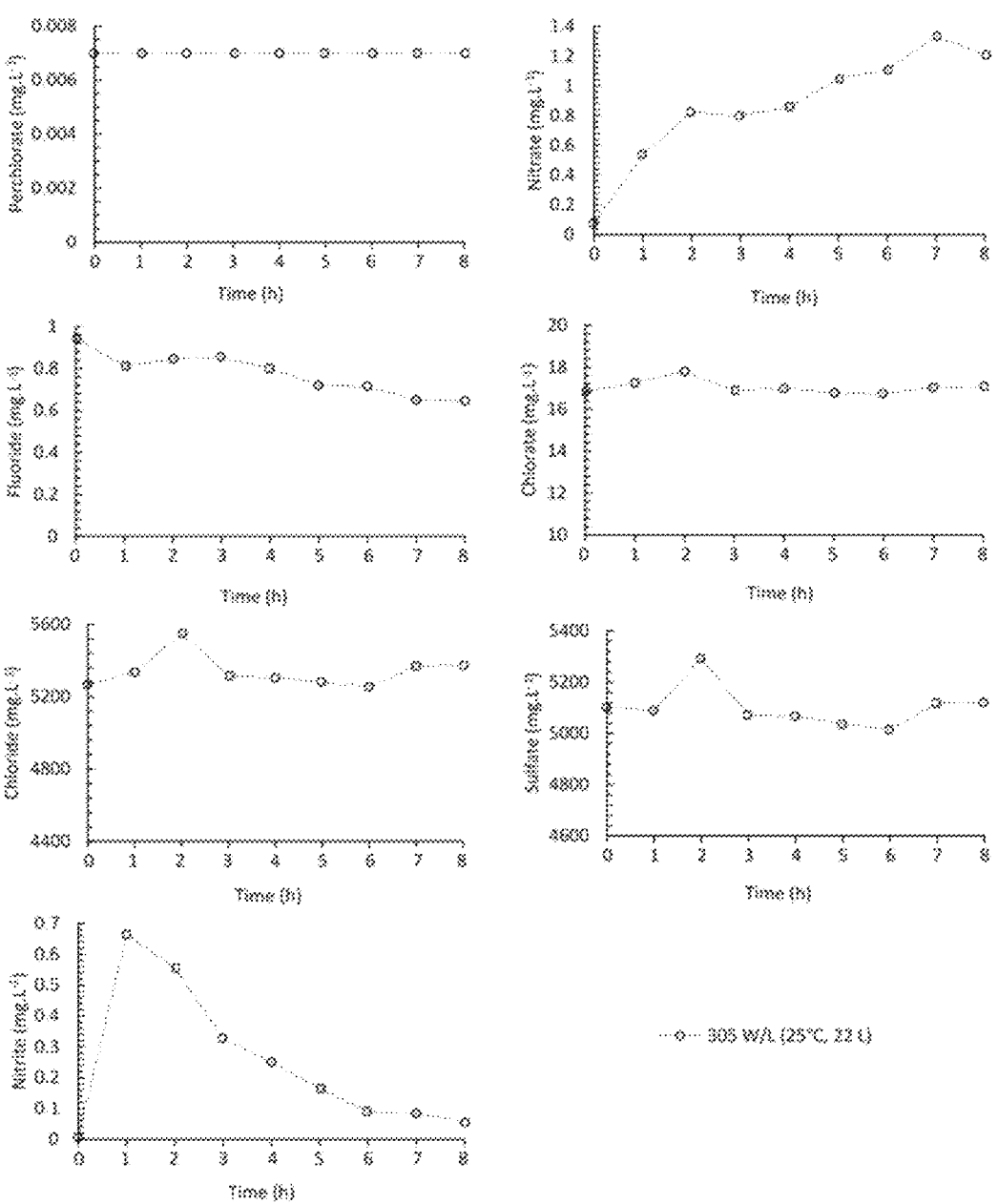
FIG. 15 depicts graphs showing the concentrations of certain anions present in the AFFF-impacted groundwater during operation conditions at 700 kHz.

FIG. 15 shows concentrations of perchlorate, fluoride, chloride, nitrite, nitrate, chlorate, sulfate during the treatment of high (10.2 g/L) TDS groundwater impacted with AFFF. The groundwater (treatment volume=22 L) was treated using a 700 kHz-7200 W closed system for 480 minutes in Argon saturated environment. The treatment was performed at 305 W/L and 25° C. The anion data indicate that the sonochemical degradation occurs even at high salinity (TDS) and that toxic products like perchlorate are not generated in this process.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for." respectively.

The invention claimed is:

1. An apparatus for destroying perfluoroalkyl or polyfluoroalkyl substances (PFASs) in a liquid, the apparatus comprising:
   a reactor comprising:
      a housing comprising a base and one or more walls that cooperate to define a chamber configured to be filled with the liquid having one or more of the PFASs;
      a transducer disposed within the chamber, the transducer comprising a plurality of ultrasonic elements each configured to generate a plurality of sound waves that propagate through the chamber; and
      a plurality of ports coupled to and in fluid communication with the chamber, at least one of the plurality of ports configured to deliver an inert gas within the chamber; and
   a controller coupled to the transducer and configured to actuate the ultrasonic elements to generate a first series of acoustic waves at a first frequency that is less than approximately 1200 kHz such that when the liquid is disposed within the chamber at least some of the one or more of the PFASs are subjected to degradation;
   wherein the chamber includes a maximum transverse dimension that is at least 2 times a height of the chamber.

2. The apparatus of claim 1, wherein the chamber includes:
   a maximum working volume of less than 15 liters.

3. The apparatus of claim 1, wherein
   the transducer comprises a plate coupled to the plurality of ultrasonic elements;
   the plurality of ultrasonic elements include:
      a first set of piezoelectric elements each configured to generate the first series of acoustic waves between 250 and 800 kHz; and a second set of piezoelectric elements each configured to generate a second series of acoustic waves at a second frequency between 250 kilohertz kHz and approximately 2000 kHz, the second frequency is different than the first frequency; and
   the controller is configured to independently actuate each of the plurality of ultrasonic elements.

4. The apparatus of claim 3, wherein the controller is configured to:
   actuate the first set of piezoelectric elements at a first time; and
   actuate the second set of piezoelectric elements at a second time.

5. The apparatus of claim 4, wherein the first and second set of piezoelectric elements are arranged such that the first and second series of acoustic waves are emitted in a same direction.

6. The apparatus of claim 1, wherein:
   at least one of the one or more of the PFASs is perfluoro-1-octanesulfonamide (FOSA-I), 1H,1H,2H,2H-perfluorooctane sulfonate (6:2FTS), 8:2FTS, 4:2FTS, perfluoro-n-octanoic acid (PFOA), perfluoro-1-octanesulfonate (PFOS), perfluoro-1-butanesulfonate (PFBS), N-(carboxymethyl) N,N-dimethyl-N-[3-(1H, 1H,2H,2H-perfluoro-1-octanesulfonamido) propan-1-yl]ammonium (NCMAmp-6:2FOSA or 6:2 FTAB), 2,3,3,3-tetrafluoro-2-(heptafluoropropoxy) propanoic acid (GenX), perfluorobutanoic acid (PFBA), PFDS, PFNS, PFHpS, PFHxS, PFPeS, N-EtFOSAA, N-MeFOSAA, PFUdA, PFDA, PFNA, PFHpA, PFHxA, or PFPeA, or.

7. The apparatus of claim 1, wherein the controller is configured to actuate the ultrasonic elements so that, when the chamber is filled with the liquid, a watt density of the reactor is greater than 100 Watts per Liter (W/L).

8. The apparatus of claim 3, wherein:
   the controller is configured to actuate the ultrasonic elements so that, when the chamber is filled with the liquid, a watt density of the reactor is greater than 500 W/L; and
   the first frequency and the second frequency are approximately between 600 and 800 kHz.

9. The apparatus of claim 1, wherein the controller is configured to actuate less than an entirety of the plurality of ultrasonic elements.

10. The apparatus of claim 1, wherein each of the ultrasonic elements are oriented in a first direction.

11. The apparatus of claim 1, wherein the housing has a maximum working volume of greater than 50 liters (L).

12. The apparatus of claim 3, wherein the second frequency is between 900 and 1000 kHz.

13. The apparatus of claim 1, wherein the plurality of ultrasonic elements includes more than 40 ultrasonic elements.

14. The apparatus of claim 3, wherein the controller is configured to:
   compare a depth of the liquid within the chamber to a threshold depth; and
   based on the depth being greater than or equal to the threshold depth, propagating the second series of acoustic waves at approximately 700 kHz; and
   based on the depth being less than the threshold depth, propagating the second series of acoustic waves at approximately 900 kHz.

15. A method for destroying PFASs in a reactor liquid via comprising a housing comprising a base and one or more walls that cooperate to define a chamber that includes a maximum transverse dimension that is at least 2 times a height of the chamber; a transducer having a plurality of ultrasonic elements disposed within the chamber; and a plurality of ports coupled to and in fluid communication with the chamber, the method comprising:

generating, at a first set of the plurality of ultrasonic elements of the transducer, a first series of sound waves at a first frequency that is less than approximately 1200 kHz;

propagating the first series of sound waves through a liquid having one or more of the PFASs disposed within the chamber; and destroying chemical bonds of at least one of the one or more of the PFASs.

16. The method of claim 15, further comprising:

generating, at a second set of the plurality of ultrasonic elements coupled to the base of the housing, a second series of sound waves at a second frequency; and wherein the chamber is a closed system such that the inert gas does not escape the chamber while the first series of sound waves are propagated through the liquid.

17. The method of claim 16, further comprising prohibiting activation of a third set of ultrasonic elements.

18. An apparatus for destroying perfluoroalkyl or polyfluoroalkyl substances (PFASs) in a liquid, the apparatus comprising:

a reactor comprising:

a housing defining a chamber configured to be filled with a liquid having one or more of the PFASs;

a transducer coupled to the chamber, the transducer comprising a plurality of ultrasonic elements each configured to generate a plurality of sound waves that propagate through the chamber; and a plurality of ports coupled to and in fluid communication with the chamber, at least one of the plurality of ports configured to deliver a gas within the chamber; and a controller coupled to the transducer and configured to actuate the ultrasonic elements to generate a first series of acoustic waves at a first frequency that is less than approximately 1200 kHz such that when the liquid is disposed within the chamber at least some of the one or more of the PFASs are subjected to degradation;

wherein:

the plurality of ultrasonic elements include:

a first set of piezoelectric elements each configured to generate the first series of acoustic waves at the first frequency; and a second set of piezoelectric elements each configured to generate a second series of acoustic waves at a second frequency that is different from the first frequency; and the controller is configured to:

actuate the first set of piezoelectric elements at a first time; and actuate the second set of piezoelectric elements at a second time that is different from the first time.

* * * * *